(12) United States Patent
Richardson et al.

(10) Patent No.: US 11,176,272 B2
(45) Date of Patent: Nov. 16, 2021

(54) METHODS, SYSTEMS, ARTICLES OF MANUFACTURE AND APPARATUS TO PRIVATIZE CONSUMER DATA

(71) Applicant: The Nielsen Company (US), LLC, New York, NY (US)

(72) Inventors: Bruce C. Richardson, Arlington Heights, IL (US); Shixiao Li, Chicago, IL (US); Martin Quinn, Sugar Grove, IL (US); Michael R. Smith, Chicago, IL (US)

(73) Assignee: The Nielsen Company (US), LLC, New York, NY (US)

( * ) Notice: Subject to any disclaimer, the term of this patent is extended or adjusted under 35 U.S.C. 154(b) by 228 days.

(21) Appl. No.: 16/235,781

(22) Filed: Dec. 28, 2018

(65) Prior Publication Data

US 2020/0082120 A1 Mar. 12, 2020

Related U.S. Application Data

(60) Provisional application No. 62/730,169, filed on Sep. 12, 2018.

(51) Int. Cl.
*G06F 21/62* (2013.01)
*G06F 21/60* (2013.01)

(52) U.S. Cl.
CPC ........ *G06F 21/6254* (2013.01); *G06F 21/604* (2013.01)

(58) Field of Classification Search
CPC ............. H04L 61/00; H04L 9/00; G04L 9/00; G06F 21/64
See application file for complete search history.

(56) References Cited

U.S. PATENT DOCUMENTS

2007/0239705 A1* 10/2007 Hunt .................. G06F 21/6245
2008/0275829 A1* 11/2008 Stull ........................ H04L 9/00
706/17

(Continued)

FOREIGN PATENT DOCUMENTS

JP 2013178637 A * 9/2013

OTHER PUBLICATIONS

Holohan et al., "(k,e)-Anonymity: k-Anonymity with e-Differential Privacy," IBM Research—Ireland, arXiv: 1710.01615v1 [cs CR] Oct. 4, 2017, 12 pages.

(Continued)

*Primary Examiner* — Joseph P Hirl
*Assistant Examiner* — Rodney E. Haven
(74) *Attorney, Agent, or Firm* — Hanley, Flight & Zimmerman, LLC

(57) ABSTRACT

Methods, systems, articles of manufacture and apparatus to privatize consumer data are disclosed. A disclosed example apparatus includes a consumer data acquirer to collect original data corresponding to (a) confidential information associated with consumers and (b) behavior information associated with the consumers, and a data obfuscator. The data obfuscator is to determine a degree to which the original data is to be obfuscated and a type of obfuscation to be applied to the original data based on the original data, generate obfuscation adjustments of the original data based on the degree and the type, and generate an obfuscation model based on the obfuscation adjustments.

39 Claims, 23 Drawing Sheets

(56) References Cited

U.S. PATENT DOCUMENTS

| | | | | |
|---|---|---|---|---|
| 2009/0259485 A1* | 10/2009 | Perlman | ................. | G06Q 50/01 |
| | | | | 705/319 |
| 2010/0058477 A1* | 3/2010 | Ciet | ....................... | H04L 9/002 |
| | | | | 726/26 |
| 2011/0178943 A1* | 7/2011 | Motahari | ............ | G06F 21/6254 |
| | | | | 705/325 |
| 2011/0179011 A1 | 7/2011 | Cardno et al. | | |
| 2012/0030165 A1* | 2/2012 | Guirguis | ............... | G06F 16/283 |
| | | | | 707/607 |
| 2012/0158953 A1* | 6/2012 | Barnes | .................... | H04L 63/04 |
| | | | | 709/224 |
| 2017/0330221 A1 | 11/2017 | Bagheri et al. | | |
| 2018/0160894 A1* | 6/2018 | Gupta | .................... | A61B 3/107 |

OTHER PUBLICATIONS

Mohammed et al., "Differentially Private Data Release for Data Mining," Conference: Proceedings of the 17th ACM SIGKDD International Conference on Knowledge Discovery and Data Mining, San Diego, CA, USA, Aug. 21-24, 2011, 9 pages.

L. Sweeney, "Achieving k-Anonymity Privacy Protection Using Generalization and Suppression," International Journal on Uncertainty, Fuzziness and Knowledge-based Systems, 10 (5), 2002; 571-588.

International Searching Authority, "International Search Report and Written Opinion," issued in connection with International Patent Application No. PCT/US2019/050201, dated Feb. 18, 2020, 9 pages.

\* cited by examiner

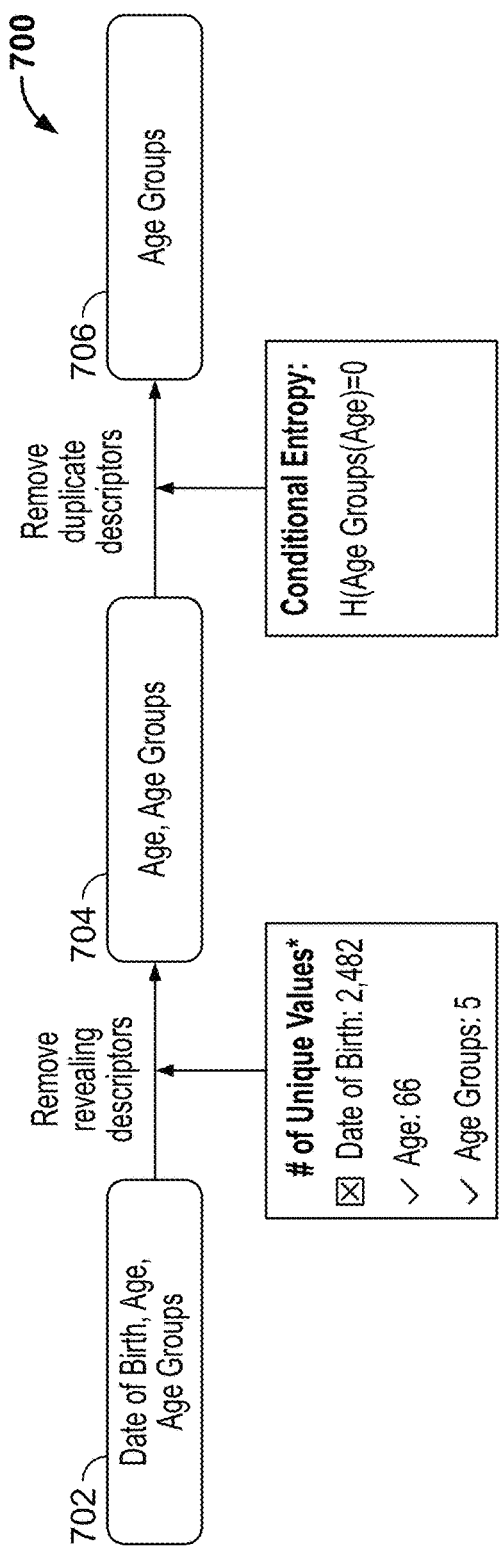

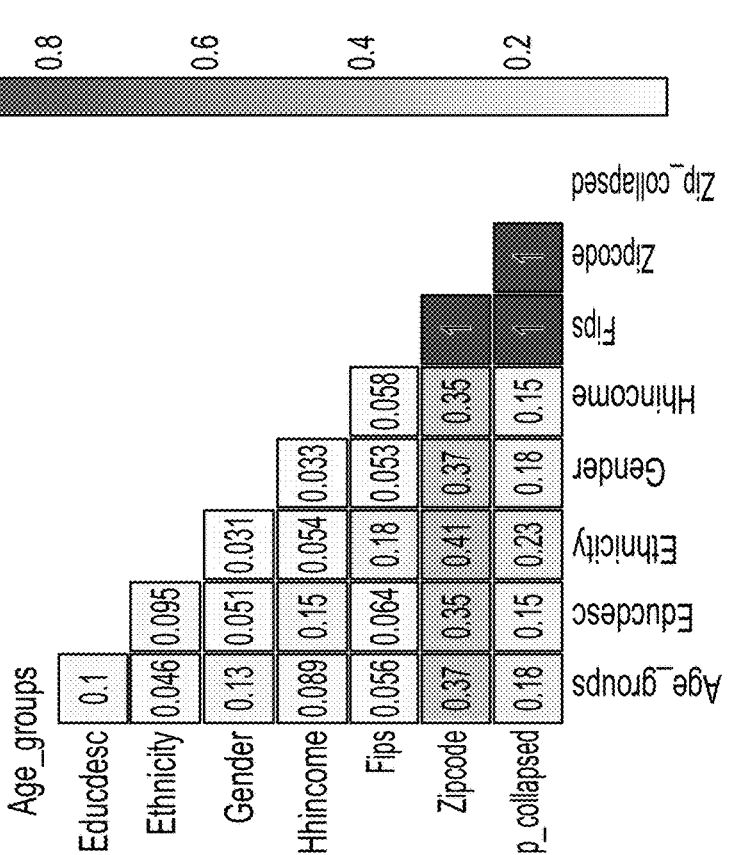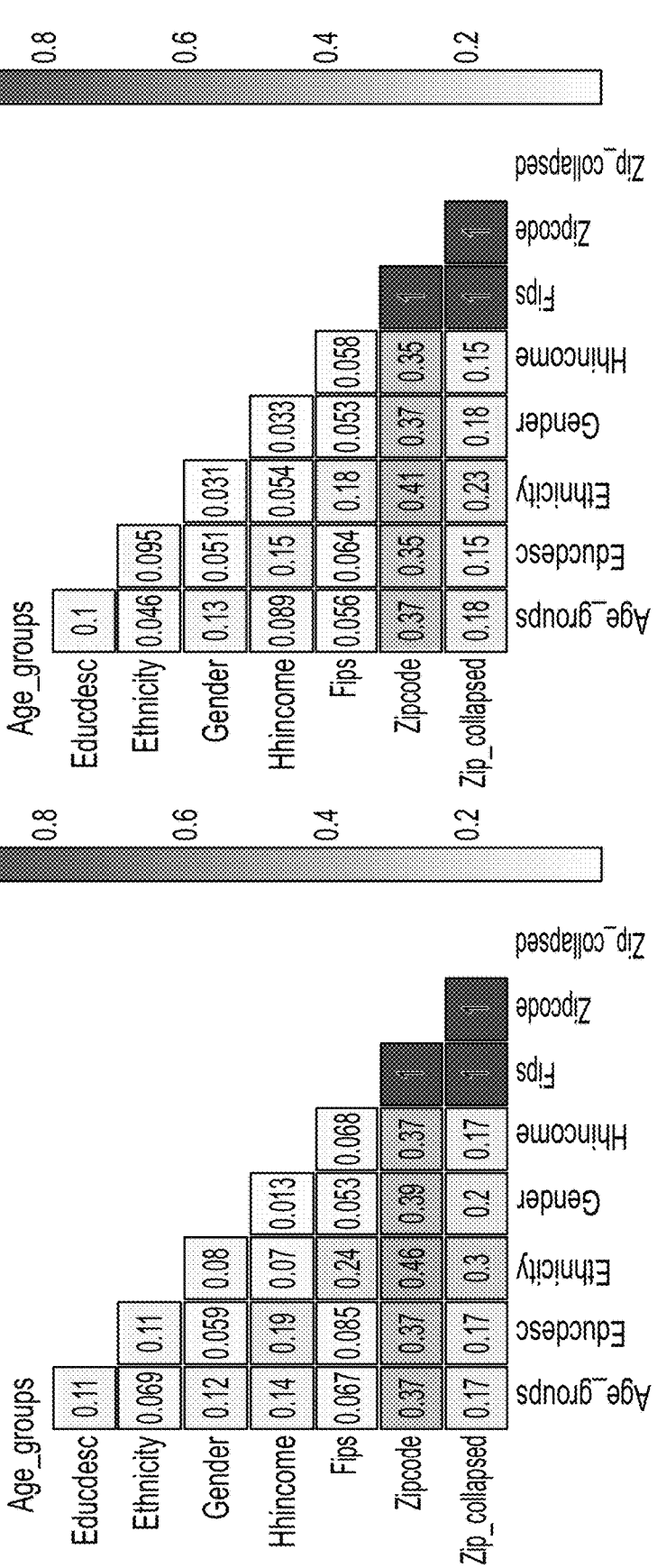
FIG. 11

| UserID | Merchant | Original Spend | Privatized Spend | Ratio |
|---|---|---|---|---|
| 1 | A | 16.67 | 19.62 | 118% |
| 2 | B | 23 | 33.81 | 147% |
| 3 | C | 7.33 | 6.62 | 90% |
| 4 | D | 7.77 | 7.12 | 92% |
| 5 | E | 4.87 | 4.56 | 94% |
| 6 | F | 3.18 | 6.53 | 205% |
| 7 | G | 36.31 | 31.56 | 87% |
| 8 | H | 199.7 | 229.09 | 115% |
| 9 | I | 11.06 | 9.39 | 85% |
| 10 | J | 2.46 | 2.56 | 104% |
| 11 | K | 25.53 | 22.48 | 88% |

METHODS, SYSTEMS, ARTICLES OF MANUFACTURE AND APPARATUS TO PRIVATIZE CONSUMER DATA

FIELD OF THE DISCLOSURE

This disclosure relates generally to consumer behavior analysis, and, more particularly, to methods, systems, articles of manufacture and apparatus to privatize consumer data.

BACKGROUND

Business insight can be improved when different datasets are combined for an analysis. In particular, multiple datasets can be analyzed together to extract and/or deduce information about consumers (e.g., consumer segments). For example, a dataset can include consumer behavior level information, such as credit card information (e.g., what was purchased, how much was purchased, when purchased). A dataset can include personal information associated with the purchasers, such as panelist information (e.g., name, age, birthdate, household location, income, education, race, political affiliations, etc.). Further, a dataset can include information about advertising exposure and/or travelling experiences.

BRIEF DESCRIPTION OF THE DRAWINGS

FIGS. 6-20 illustrate example obfuscation techniques that can be implemented in examples disclosed herein.

The figures are not to scale. In general, the same reference numbers will be used throughout the drawing(s) and accompanying written description to refer to the same or like parts.

DETAILED DESCRIPTION

Figure 1:
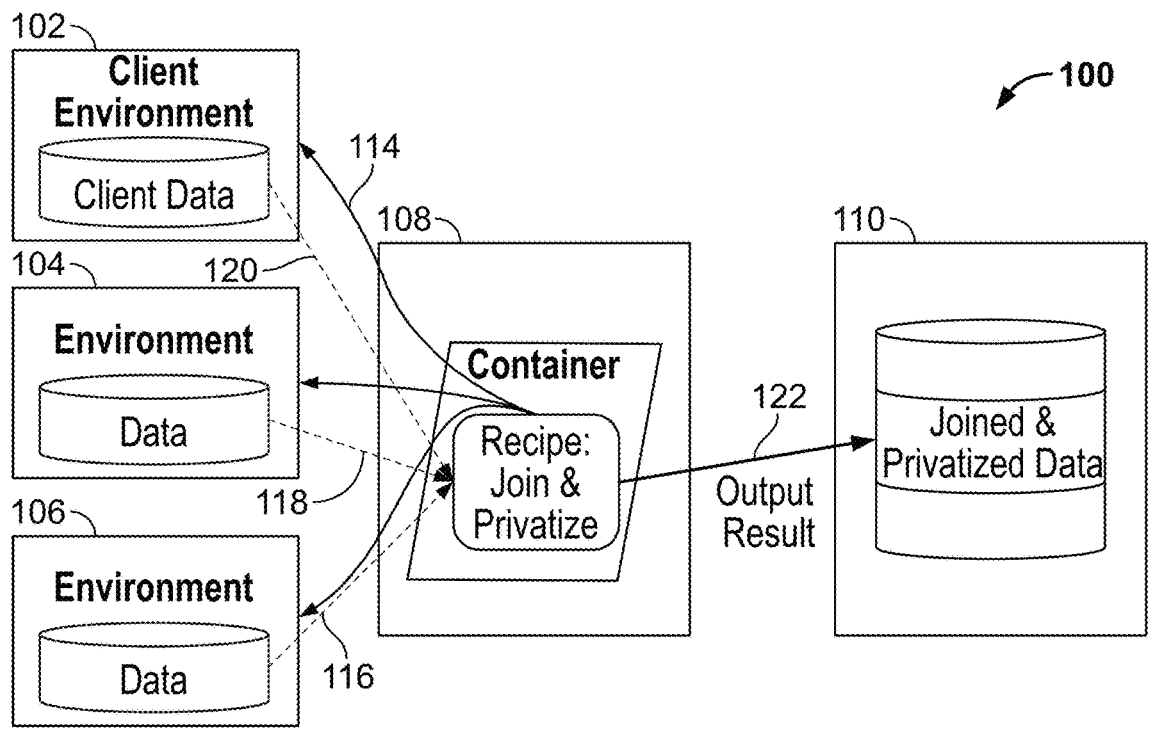
FIG. 1 illustrates an example privatization data process architecture in accordance with teachings of this disclosure.

Methods, systems, articles of manufacture and apparatus to privatize consumer data are disclosed. Typically, multiple consumer information datasets are combined from different sources to gather and analyze information of consumers and/or consumer segments. In particular, combining information associated with consumer information data sets from different sources reveals a great deal of information that can be used to tailor marketing/advertising campaigns, such as identifying particular age groups that are likely to purchase particular products, and identifying particular neighborhoods likely to purchase particular products. While separate entities providing the datasets can have unique control and/or possession of each type of dataset, in the event one of those entities has access to multiple combined datasets, privacy concerns can arise.

Even if one of the aforementioned entities possesses personal panelist information, great care must be taken when releasing one or more portions of such data to address privacy concerns and/or prevent privacy law violations. For instance, in the event consumer information is released with a consumer's age, a consumer's occupation and a consumer's gender for a specific zip code, then a likelihood of uniquely identifying that consumer can be relatively high when the zip code has a relatively low population, for example.

With access to consumer data (e.g., analysis results) associated with the aforementioned datasets, privacy can be a concern. In particular, personal data associated with consumers can be extracted or deduced from results of the analysis, data related with the analysis and/or combined datasets utilized in conjunction with the analysis.

In some known implementations, individuals, such as individuals from different entities, are used to obscure (e.g., manually obscure) personal data and/or are aware of the privacy details or manners in which the personal data is obscured (e.g., the individuals act as privacy gatekeepers). However, such individual-driven implementations are not able to be scaled favorably for large data sets and require manual operations, which can be time-consuming and/or labor intensive.

Examples disclosed herein enable private information associated with consumer data sets to be obscured/obfuscated without significantly affecting data and/or analyses associated with the consumer data sets. In other words, examples disclosed herein enable effective consumer data privatization without skewing, biasing or altering overall data characteristics utilized for consumer analyses that utilize multiple consumer data sets (e.g., multiple consumer data sets from different sources). Examples disclosed herein determine a degree to which consumer data is to be obfuscated and a type of obfuscation to be applied to the consumer data based on the consumer data (e.g., aspects related to the consumer data including descriptor types, combination(s) of descriptors, combination(s) of data type(s), etc.). Based on the degree and the type of obfuscation, obfuscation adjustments to be applied to one or more sets of data are generated without significant skewing of overall analytical results. The obfuscation adjustments are applied to the one or more sets of data as an obfuscation model, for example. Examples disclosed herein reduce and/or eliminate process and time inefficiencies due to typically necessitated human diligence.

To obfuscate and/or alter confidential information, examples disclosed herein generate a model and/or data converter. The model can consist of obfuscated data or be implemented as a program/converter to obfuscate data (e.g., a converter program). The model can be analyzed and/or used to obfuscate other consumer data and/or consumer information datasets. In some examples, the model is utilized to process non-obfuscated data in a manner that prohibits localized storage of confidential information while still generating marketing business insights.

In some examples, noise (e.g., Laplace noise, Poisson noise) is applied to obfuscate the data. In some examples, implementing obfuscation adjustments includes calculating a conditional entropy and a conditional distribution. In some such examples, the conditional entropy is used to determine which duplicative descriptors can divulge personal information, for example.

As used herein, the terms "model" and "obfuscation model" can refer to obfuscated data, a computer executed program, and/or hardware that converts, obfuscates and/or otherwise scrambles data (e.g., consumer information). As used herein, the term "original data" refers to data that has not been privatized and/or obfuscated. Accordingly, the terms "privatized data" or "obfuscated data" refer to data that has been altered, rearranged, collapsed, truncated and/or had portions replaced/scrambled, etc. to inhibit or hinder any attempts to glean private data therefrom.

FIG. 1 illustrates an example privatization data process architecture 100 in accordance with the teachings of this disclosure. The example data process architecture 100 aggregates consumer information data sets, and privatizes data associated with consumers of the datasets. However, overall trends and/or analysis results associated with the aggregated consumer information data sets are significantly preserved. The example process data architecture 100 includes a first data source 102, a second data source 104, and third data source 106. The example process data architecture 100 also includes a transformation engine (e.g., a privatization engine, a transitory data environment, an analysis environment, a privatization processing environment, etc.) 108 and a synthetic data engine 110.

To gather and/or aggregate consumer information data sets (e.g., confidential information, consumer behavior data, etc.), the example transformation engine 108 of FIG. 1 requests and/or retrieves consumer data (e.g., consumer information datasets) from the first data source 102, as generally indicated by an arrow 114. In this example, the transformation engine 108 receives consumer data from both the second data source 104 and the third data source 106, as generally indicated by arrows 116, 118. Further, the transformation engine 108 retrieves consumer data from the first data source 102, as generally indicated by an arrow 120. While the example of FIG. 1 shows both requested and received consumer data sets, any appropriate combination of received and/or requested data can be implemented instead.

In the illustrated example of FIG. 1, the transformation engine 108 combines the consumer data from the first, second and third data sources 102, 104, 106 to define combined aggregate data. Further, the example transformation engine 108 determines a degree and manner to which the combined data is to be obfuscated, and obfuscates the combined data, sets of data and/or a set of data extracted from the consumer data (e.g., a set derived as a portion or part of the consumer data). This example obfuscation by the transformation engine 108 of consumer data for privacy to a determined degree and manner is described in greater detail below in connection with FIGS. 2-28.

The example synthetic engine 110 is provided with the obfuscated consumer data for analysis and/or a corresponding model. In this example, the synthetic engine 110 retrieves an output result, which includes the combined obfuscated data, from the transformation engine 108, as generally indicated by an arrow 122. In other words, the synthetic environment 110 serves as a location and/or data storage in which obfuscated consumer data and/or a corresponding model that is analytically accurate in an aggregate sense can be stored without risk of access to confidential or private information. In the illustrated example of FIG. 1, the synthetic engine 110 is used for analysis of the aforementioned data, such as determining consumer trends or a consumer demographic of at least one area or geographical region. Additionally or alternatively, the synthetic engine 110 can be used to distribute and/or develop an obfuscation model and/or data converter (e.g., a consumer data converter program, etc.) to convert (e.g., privatize) other consumer information dataset(s).

Figure 2:
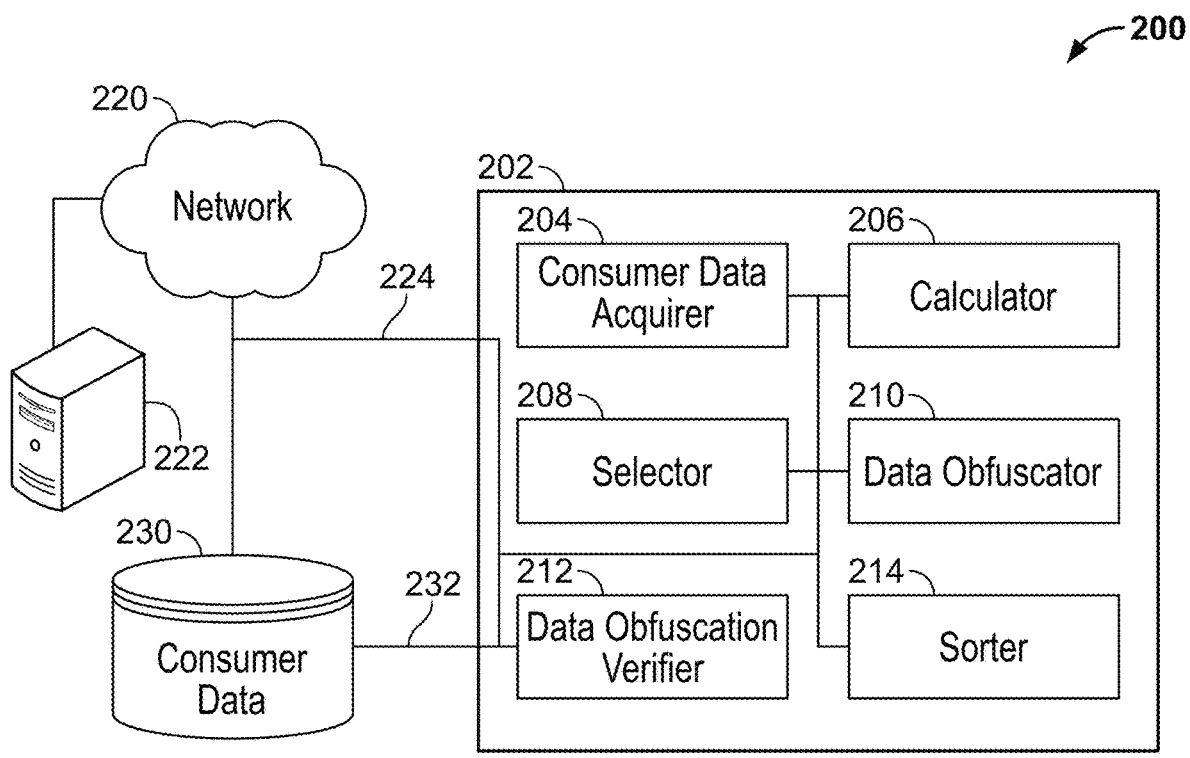
FIG. 2 is a schematic overview of an example data privatization system that can be implemented to perform the example privatization data process architecture of FIG. 1.

FIG. 2 is a schematic overview of an example data privatization system 200 that can be implemented to perform the example privatization data process architecture 100 of FIG. 1. The data privatization system 200 of the illustrated example of FIG. 2 includes a data privacy analyzer 202 having an example consumer data acquirer 204, an example calculator 206, an example selector 208, an example data obfuscator 210 and an example sorter 214. In some other examples, the data privatization system 200 includes an example data obfuscation verifier 212. Further, the example data privatization system 200 includes an example network 220 and an example remote server 222, both of which are communicatively coupled to the data privacy analyzer 202 via an example communication line 224. In this example, a consumer data storage 230 is communicatively coupled to the data privacy analyzer 202 via a communication line 232.

The consumer data acquirer 204 of the illustrated example of FIG. 2 receives, collects and combines consumer data received as datasets from multiple sources (e.g., the data sources 102, 104, 106). In this example, the consumer data acquirer 204 receives a first dataset including confidential information associated with consumers, and a second dataset including behavior information associated with the consumers from the remote server 222 and/or the network 220. In some examples, the consumer data acquirer receives a third data set associated with consumer travel information. However, any other appropriate combination of datasets, data sources, network topology and/or consumer-data type can be implemented instead.

In some examples, the selector 208 selects a set and/or a portion of data from the consumer information data collected by the consumer data acquirer 204. In some such examples, the selector 208 selects a set of confidential information related to one consumer. In some examples, the set of data corresponds to multiple consumers and/or a subgroup of consumers associated with the consumer information.

In some examples, the calculator 206 calculates a likelihood of determining an identity of a person of the aforementioned consumer based on the set of the confidential information and the behavior information. In particular, the example calculator 206 determines a metric and/or score that indicates whether consumer identities can be extracted, deduced and/or extracted (e.g., a probability, a degree to which the consumer data is scrambled, etc.).

In the illustrated example of FIG. 2, the data obfuscator 210 generates obfuscation adjustments (e.g., scrambling, shifting, collapsing, replacing, etc.) corresponding to at least one of the sets of the confidential information or the behavior information. In this example, the data obfuscator 210 determines a degree to which original data (e.g., confidential information of consumers, behavior information, advertisement exposure of consumers, travel information of consumers, etc.) is to be obfuscated (e.g., an obfuscation degree, an obfuscation level, etc.) and a type of obfuscation to be applied to the original data based on analyzing the original data and/or privacy requirements (e.g., a privacy metric). Examples of obfuscation methodologies that can be applied, alone or in combination, are described in greater detail below in connection with FIGS. 3-20. In this example, the obfuscation adjustments are used to develop or generate an obfuscation data converter (e.g., an obfuscation model, an obfuscation converter, a data privatizer, etc.) that can be used to obfuscate consumer data sets. In some such examples, the obfuscation data converter does not include any personal consumer data. In some examples, the data obfuscator 210 applies noise, such as Laplace noise or Poisson noise, to the consumer data and/or selected consumer data for obfuscation. Generally speaking, application of noise improves a degree of safety for consumer by causing a likelihood of unique identification to decrease. However, such noise application also reduces a degree of utility of the data to represent actual consumer behavior(s).

In some examples, the data obfuscator 210 collapses, replaces and/or adds noise to consumer data based on the determined degree to which the original data is to be obfuscated (e.g., a percentage, a ratio of values, a percentage of descriptors to be obfuscated, etc.) and the type of obfuscation (e.g., collapsing, replacing, scrambling, etc.) to be applied to the consumer data. In some examples, the data obfuscator 210 is implemented with datasets including an individual identifier (e.g., held as an encrypted key), and personal descriptors that are collapsed and/or replaced. Additionally or alternatively, the data obfuscator 210 is implemented with purchase records or tuples. In such examples, portions of the tuples can be replaced (e.g., where, when and how much) and/or noise can be introduced. For example, all "how much" values are modified using multiplicative Laplace noise. Additionally or alternatively, outliers can be forced back to defined limits prior to adding noise, and adding Poisson noise to day values. In some examples, time values are modified by collapsing to hours.

According to the illustrated example of FIG. 2, to privatize personal descriptors, the data obfuscator 210 privatizes geographic, demographic and/or socio-economic information corresponding to individuals. In particular, the example data obfuscator 210 removes duplicative information, collapses descriptor values that might be too revealing, identifies individuals whose combination of descriptors is too revealing (e.g., exceeds a threshold likelihood of identification value) and change their corresponding replacement rate, and/or replaces values of descriptors to obfuscate the individuals. In some examples, duplicative information is removed and/or collapsed via utilization of conditional entropy.

In some examples, the data obfuscator 210 scans values (e.g., occurrence values) corresponding to types of variables to compute how many individuals show up with each variable (e.g., individuals having a reported income greater than $200,000, etc.), and collapses the data to ensure k-anonymity where, in some examples, k=20 such that the likelihood of identifying an individual is 1/20 or 5%. The example data obfuscator 210 can also verify that no combination of descriptors can expose an identity of an individual. Additionally or alternatively, the example data obfuscator 210 measures a univariate distribution of bivariate relationships between variables. Additionally or alternatively, the data obfuscator 210 randomly replaces values for descriptors based on original distributions. In some examples, a combination of k-anonymity and random replacement of descriptors reduces a probability of identifying an individual.

In some examples, the data obfuscator 210 privatizes a sequence of information related to spending, also known as the aforementioned tuples. In particular, tuples or purchase records can indicate how much was spent, where the spending occurred, and when the spending occurred. In some examples, this data is privatized by scanning values of "where" to compute how many individuals show up with each variable (e.g., purchased in Merchant A), and collapsing, as appropriate, to ensure k-anonymity (e.g., to satisfy a threshold likelihood of identifying an individual). In some examples, the univariate distribution of merchants is measured and stratified to both geography and spending amounts (e.g., low transaction spend merchants vs. high transaction spend merchants). Accordingly, the "where" based on these spending tiers and location can be randomly replaced. In some examples, noise is introduced by the data obfuscator 210 to purchases (e.g., "how much") in a manner consistent with example Equation 1:

$$e^{ln(new\_sale)} = e^{(ln(old\_sale)+y)} \quad (1)$$

where y is distributed with a Laplace with a mean ln(0.91), and a variance b=0.3 (e.g., Y~Laplace(ln(0.91), 0.3). Therefore, E(new_sale) is approximately equal (e.g., equal) to E(old_sale).

Further, noise can be applied by the data obfuscator 210 to the "when" in a manner consistent with example Equation 2:

$$new\_day = old\_day + w*z \quad (2)$$

where z~Poisson($\lambda$), and w~Bernoulli(0.5) on −1 or +1, for example.

In some examples, the data obfuscator 210 replaces the "where" of a merchant. For example, a merchant can be replaced with a merchant of a same locale (e.g., a same county, same state or city, a merchant a threshold distance away), from a similar tier and channel based on a frequency of visit distribution within the locale and the tier. For example, a merchant only in Illinois will not be replaced with one from another state (e.g., California). In some examples, location replacements are constrained to geographical parameters that are adjacent (e.g., an adjacent city, an adjacent state, etc.). In terms of tier, abnormal spend replacements and merchants can be divided into several tiers based on trip spending (e.g., spending over $2,000 at a Merchant B store is not replaced with Merchant A, but could be replaced with Merchant C instead, assuming spending behavior at Merchant A varies sufficiently from Merchants B and C). In terms of channel, if available, a channel outlet definition can be used to guarantee that patterns or trends remain substantially similar. In some examples, merchants are replaced according to trip distribution within a same stratum to maintain trip distributions (e.g., even though Merchant A and Merchant D are equally likely across all strata, if 80% of trips from Merchant A and 20% of the trips are from Merchant D, then a merchant within this same stratum has an 80% chance of being replaced with Merchant A as opposed to 20% chance of being replaced by Merchant D).

In some other examples, the data privatization system 200 includes the data obfuscation verifier 212. In some such examples, the example data obfuscation verifier 212 verifies that the obfuscation adjustments obscure the set of the confidential information and the behavior information to a threshold degree. For instance, the example data obfuscation verifier 212 calculates an obfuscation likelihood metric (e.g., a percentage value of a likelihood that an individual will be uniquely identified, an obfuscation adjustment threshold value, etc.), and verifies whether the aforementioned metric satisfies an obfuscation likelihood threshold. Additionally or alternatively, the data obfuscation verifier 212 verifies that first calculated data (e.g., analytical data, trend data, etc.) based on the first and second datasets of the original data and second calculated data that is based on applying the obfuscation adjustments to the original data has a similarity index that exceeds a similarity threshold. In other words, the data obfuscation verifier 212 can be used to verify that obfuscated consumer data (e.g., consumer data used for later analyses) is not altered and/or skewed from original consumer data within a threshold similarity (e.g., a similarity index value) from an aggregate data analysis perspective. Accordingly, once verified, the obfuscated data can be used to make statistical determination and/or develop a model/converter.

As mentioned above, in some examples, the data obfuscator 210 utilizes conditional entropy to obfuscate consumer data. In such examples, the conditional entropy quantifies an amount of information needed to describe an outcome of a random variable, Y, given a value of another random variable, X, is known. The example data obfuscator 210 calculates conditional entropy in a manner consistent with example Equation 3:

$$H(Y|X) = \Sigma_{x \in X} p(x) H(Y|X=x) \quad (3)$$

For example, if an age, gender and education are known, at least one concern of interest is how much information is needed to identify a person and/or a user ID associated with the person. Shannon Entropy, H, shows a dispersion in a variable, which is shown below in connection with example Equation 4:

$$H = -1 * \text{SUM}\{P_i * \ln(P_i)\} \quad (4)$$

In some examples, the data privatization system 200 includes the sorter 214. For example, the sorter 214 can be used to remove outliers from one or more consumer information datasets. In some examples, the outliers include data inconsistent with one or more consumer information data sets. Additionally or alternatively, the outliers include consumer data that would allow at least one consumer's personal information or identity to be easily discerned.

While an example manner of implementing the data privatization system 200 of FIG. 2 is illustrated in FIGS. 1 and 2, one or more of the elements, processes and/or devices illustrated in FIGS. 1 and 2 may be combined, divided, re-arranged, omitted, eliminated and/or implemented in any other way. Further, the example transformation engine 108, the example synthetic engine 110, the example consumer data acquirer 204, the example calculator 206, the example selector 208, the example data obfuscator 210, the example data obfuscation verifier 212, the example sorter 214 and/or, more generally, the example data privatization system 200 of FIGS. 1 and 2 may be implemented by hardware, software, firmware and/or any combination of hardware, software and/or firmware. Thus, for example, any of the example consumer data acquirer 204, the example calculator 206, the example selector 208, the example data obfuscator 210, the example data obfuscation verifier 212, the example sorter 214 and/or, more generally, the example data privatization system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transformation engine 108, the example synthetic engine 110, the example consumer data acquirer 204, the example calculator 206, the example selector 208, the example data obfuscator 210, the example data obfuscation verifier 212, and/or the example sorter 214 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data privatization system 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
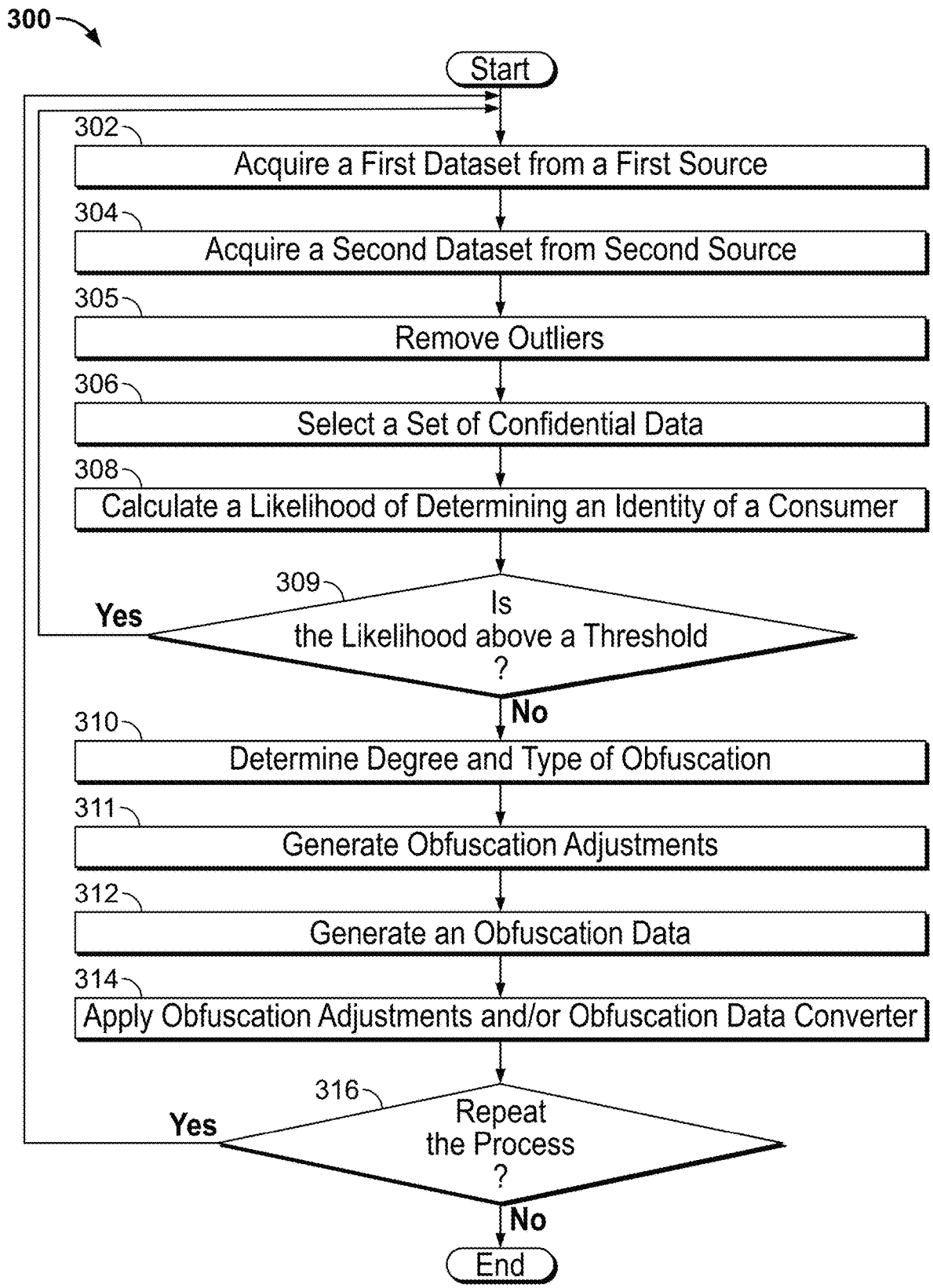
FIG. 3 is a flowchart representative of machine readable instructions which may be executed to implement the example data privatization system of FIG. 2.
Figure 4:
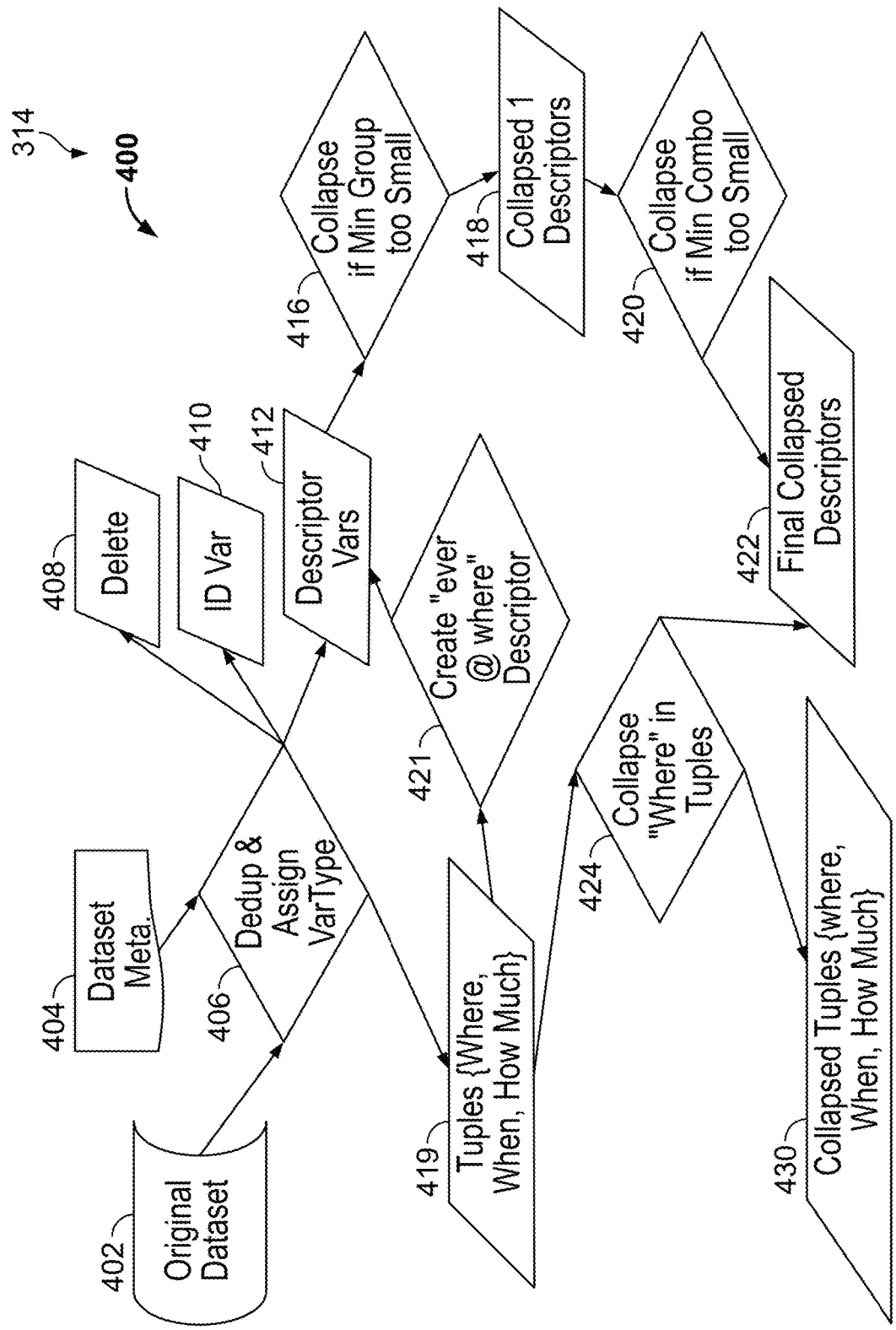
FIG. 4 is a schematic data flow representing an example program of the machine readable instructions of FIG. 3.
Figure 5:
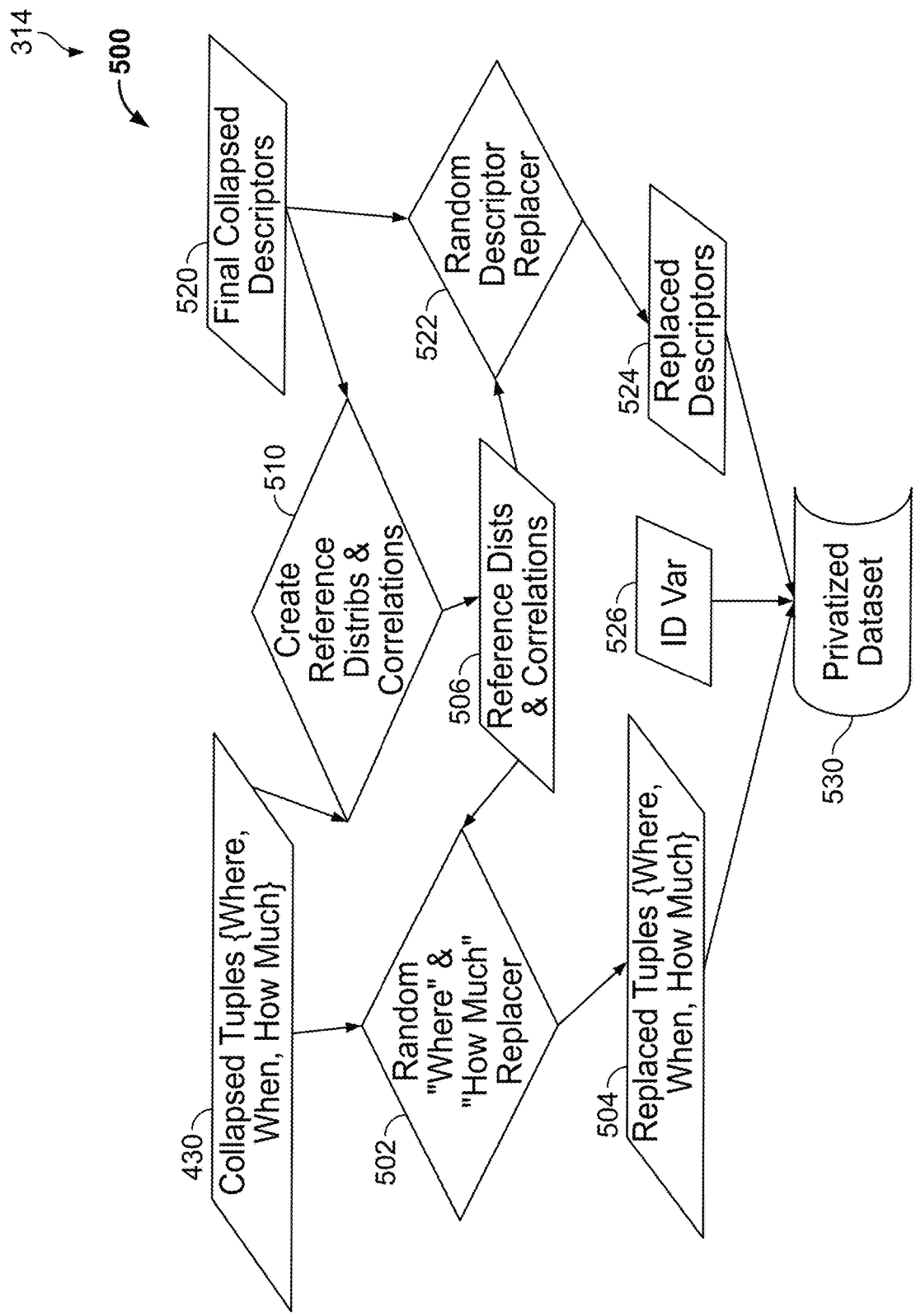
FIG. 5 is a schematic data flow representing another example program of the machine readable instructions of FIG. 3.

Flowcharts representative of example hardware logic, machine readable instructions, hardware implemented state machines, and/or any combination thereof for implementing the data privatization system 200 of FIG. 2 are shown in FIGS. 3-5. The machine readable instructions may be an executable programs or portion(s) of one or more executable programs for execution by a computer processor such as the processor 2912 shown in the example processor platform 2900 discussed below in connection with FIG. 29. The program(s) may be embodied in software stored on a non-transitory computer readable storage medium such as a CD-ROM, a floppy disk, a hard drive, a DVD, a Blu-ray disk, or a memory associated with the processor 2912, but the entire program(s) and/or parts thereof could alternatively be executed by a device other than the processor 2912 and/or embodied in firmware or dedicated hardware. Further, although the example program(s) is/are described with reference to the flowcharts illustrated in FIGS. 3-5, many other methods of implementing the example data privatization system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program 300 of FIG. 3 includes block 302, where the example consumer data acquirer 204 acquires a first dataset from a first source. In this example, the first dataset includes confidential information associated with at least one consumer. At block 304, the example consumer data acquirer 204 acquires a second dataset from a second source. In this example, the second dataset includes behavior information associated with the consumers. In some examples, the example sorter 214 removes outliers from at least one of the aforementioned first and second datasets (block 305). In some examples, the example selector 208 selects a set (e.g., a subset, a portion) of the confidential information associated with at least one of the consumers (block 306). In some such examples, the set is selected based on one of the consumers.

At block 308, in some examples, the example data obfuscator 210 and/or the data obfuscation verifier 212 calculates a likelihood of determining an identity of the at least one consumer (e.g., one of the consumers).

At block 309, in some examples, the data obfuscator 210 and/or the data obfuscation verifier 212 determines whether the likelihood is above a threshold (e.g., a privacy threshold, an obfuscation threshold, a threshold criteria, a threshold value, etc.). If the likelihood is above a threshold (block 309), control of the process returns to block 302. Otherwise, the process proceeds to block 310.

At block 310, the example data obfuscator 210 determines a degree to which data associated with the at least one consumer is to be obfuscated (e.g., an obfuscation degree, an obfuscation level, etc.) and a type of obfuscation to be applied to the data (e.g., replacing, substituting, collapsing, etc.). In some examples, the determination of the degree and/or the type of obfuscation is based on analyzing the types of descriptors and/or descriptor combination(s) in the data (e.g., the combined data from the first, second and/or third data sets). Additionally or alternatively, the degree of obfuscation is determined based on a desired privacy metric and/or threshold (e.g., a privacy agreement and/or metric defined by a privacy agreement).

In the illustrated example of FIG. 3, the data obfuscator 210 generates obfuscation adjustments corresponding to the confidential information and the behavior information (block 311). In this example, the obfuscation adjustments are defined/generated based on the degree to which the data is to be obfuscated and the determined typed of obfuscation. In some examples, the example data obfuscator 210 generates the obfuscation adjustments based on the selected set of the confidential information.

At block 312, the example data obfuscator 210 generates an obfuscation model (e.g., an obfuscation data converter). In some other examples, the obfuscation model is generated in response to the data obfuscation verifier 212 verifying that the obfuscation adjustments sufficiently obscure the confidential information and the behavior information. Further, in such examples, the example data obfuscation verifier 212 also verifies that first calculated data based on the first and second datasets have similarity, within a requisite similarity metric, with second calculated data that is based on applying the obfuscation adjustments to the confidential information and the behavior information.

At block 314, in some examples in which the obfuscation model is verified, upon verification of the obfuscation model, the example data obfuscator 210 applies the obfuscation adjustments and/or the obfuscation data converter to the confidential information (e.g., the selected set of the confidential information) and the consumer behavior information to define an obfuscated dataset. In some examples, the example data obfuscation verifier 212 determines whether to repeat the process (block 316). If the process is to be repeated (block 316), control of the process returns to block 302. Otherwise, the process ends.

FIG. 4 is a schematic data flow representing an example program 400 to collapse data that can be executed with the program of block 314 corresponding to FIG. 3. According to the illustrated example of FIG. 4, the program 400 begins as an original dataset 402 and dataset metadata 404 are provided to be sorted by the example data obfuscator 210 at assigned variable types (block 406). Subsequently, some data is deleted 408 and certain identifying variables 410 are extracted.

According to the illustrated example of FIG. 4, descriptor variables 412 from the aforementioned assigned variable types 406 are used by the example data obfuscator 210 to create "@ where" descriptors 412 and collapsed by the example data obfuscator 210 if a minimum number (e.g., number of individuals) is too small (block 416) to yield collapsed descriptors 418. If a combination of the collapsed descriptors 418 is too small in number (block 420), the descriptors 418 are collapsed by the example data obfuscator 210 to yield the final collapsed descriptors 422.

In this example, the assigned variable types 406 are used by the example data obfuscator 210 to yield tuples 419, which correspond to data related to purchases (e.g., where a purchase occurred, when did the purchase occur, the purchase amount, etc.), thereby yielding a descriptor (e.g., an "ever @ where" descriptor) 421 that can be added to or used in conjunction with the aforementioned descriptor variables 412. In this example, the tuples 419 are collapsed by the example data obfuscator 210 based on an occurrence of "where" (block 424) to yield collapsed tuples 430. Further, the collapsed tuples are provided with the final collapsed descriptors 422 in this example. While the tuples 419 of this example are related to purchase event details, the tuples 419 can be used for other types of data.

FIG. 5 is a schematic data flow representing an example program 500 that can be used in the execution of the program of block 314 corresponding to FIG. 3. In this example, the program 500 is used for data replacement and executed subsequent to the program 400 of FIG. 4. In other examples, the program 500 is applied without the program 400 and vice-versa.

According to the illustrated example of FIG. 5, the collapsed tuples 430 of FIG. 4 are replaced by the example data obfuscator 210 with random values for "where" and "how much" (block 502) to define replaced tuples 504. Further, the collapsed tuples 430 are used by the example data obfuscator 210 to create reference distributions and correlations 510 that define reference distributions and correlations 506 used for the aforementioned replacements of block 502.

In this example, the reference distributions and correlations 510 are used by the example data obfuscator 210 to define final collapsed descriptors 520 and, in turn, random descriptor replacer(s) 522. Further, the random descriptor replacer(s) 522 is used by the example data obfuscator 210 to define replaced descriptors 524, which in combination with an identification variable 526 (e.g., the identification variable 410 of FIG. 4) and the replaced tuples 504, generates a privatized dataset 530.

The example programs 400, 500 of FIGS. 4 and 5, respectively, are only examples of collapsing and replacing portions of data to generate a privatized dataset, any appropriate obfuscation method, combination of obfuscation types and/or data conversion can be implemented instead.

Figure 6:
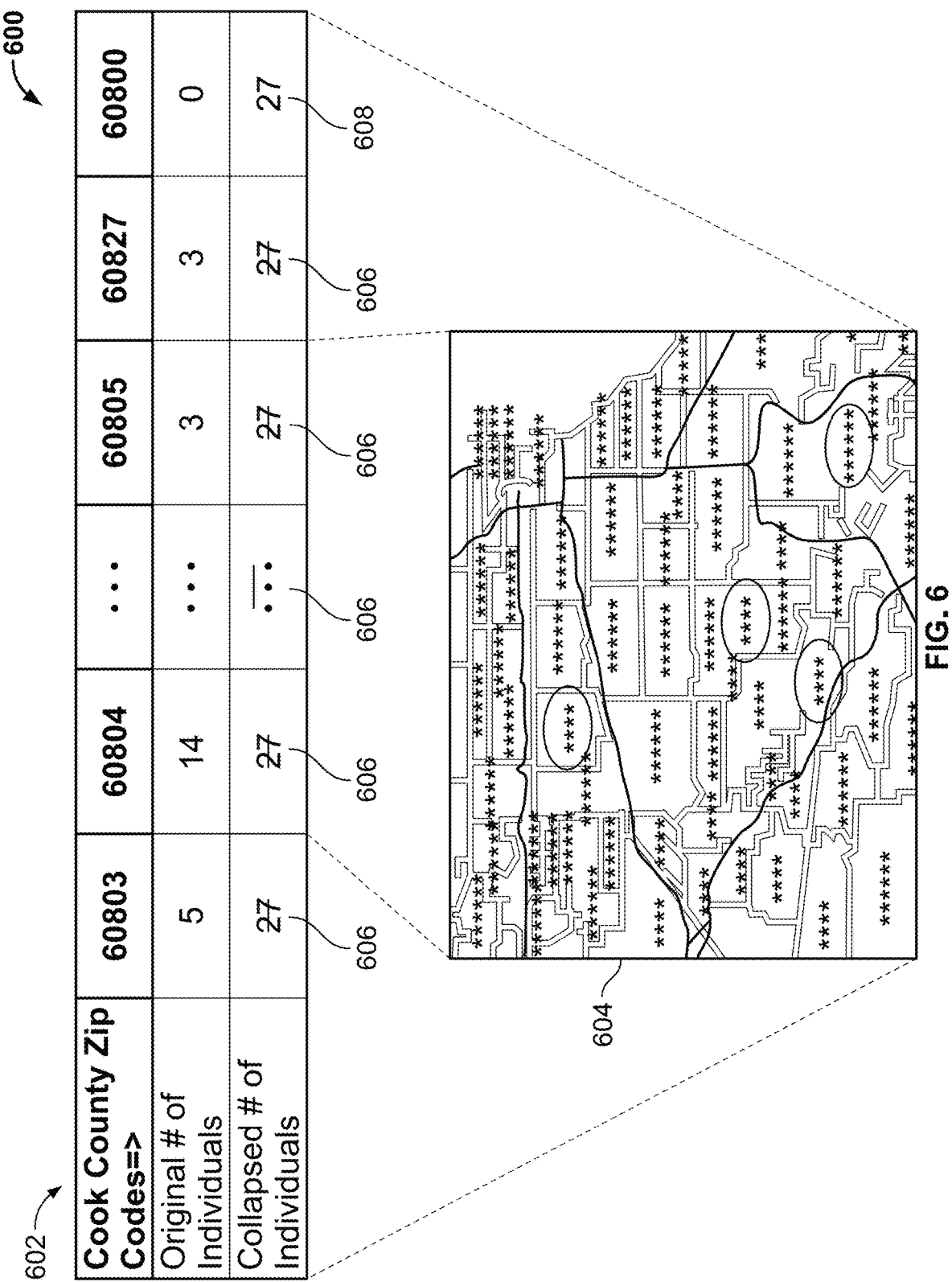

FIGS. 6-20 illustrate example obfuscation techniques that can be implemented in examples disclosed herein. Turning to FIG. 6, an example table 600 that illustrates collapsing zip codes is shown. In the illustrated example of FIG. 6, headings 602 associated with multiple zip codes correspond to an example map 604. In this example, values 606 are collapsed by the example data obfuscator 210 into a single value 608. In this particular, the values 606 are collapsed because a size of the sample is small enough to potentially reveal private consumer information (e.g., this configuration fails a threshold verification test in view of an obfuscation metric).

In some examples, for ordered descriptors (e.g., an age group), if a value has too few individuals, then the value can be combined by the example data obfuscator 210 with a neighboring zip code and/or region that has the smallest number of individuals. For non-ordered descriptors (e.g., party affiliation or home ownership), if a value has too few individuals, then the individuals can be re-assigned by the example data obfuscator 210 to a grouping called "all others" or "unknown," for example.

FIG. 7 illustrates a program 700 that removes personal descriptors that can be duplicative and, thus, revealing. In this example, dates of birth are removed by the example data obfuscator 210 while ages and/or age groups are kept between blocks 702 and 704. However, between the block 704 and a block 706, the personal descriptors related to age are removed by the example data obfuscator 210. In some examples, a conditional entropy is used by the example data obfuscator 210 for data obfuscation/privatization.

FIG. 8 illustrates example personal descriptor replacement that can be implemented by the example data obfuscator 210. In this example, a table 800 includes columns 802 that represent categories related to consumer data and rows 804 that represent individuals. Accordingly, arrows 810 indicate replacement of education descriptions, arrows 812 replacement of ethnicity descriptions, arrows 814 represent replacement of gender data, and arrows 816 represent replacement of income information.

Figure 9:
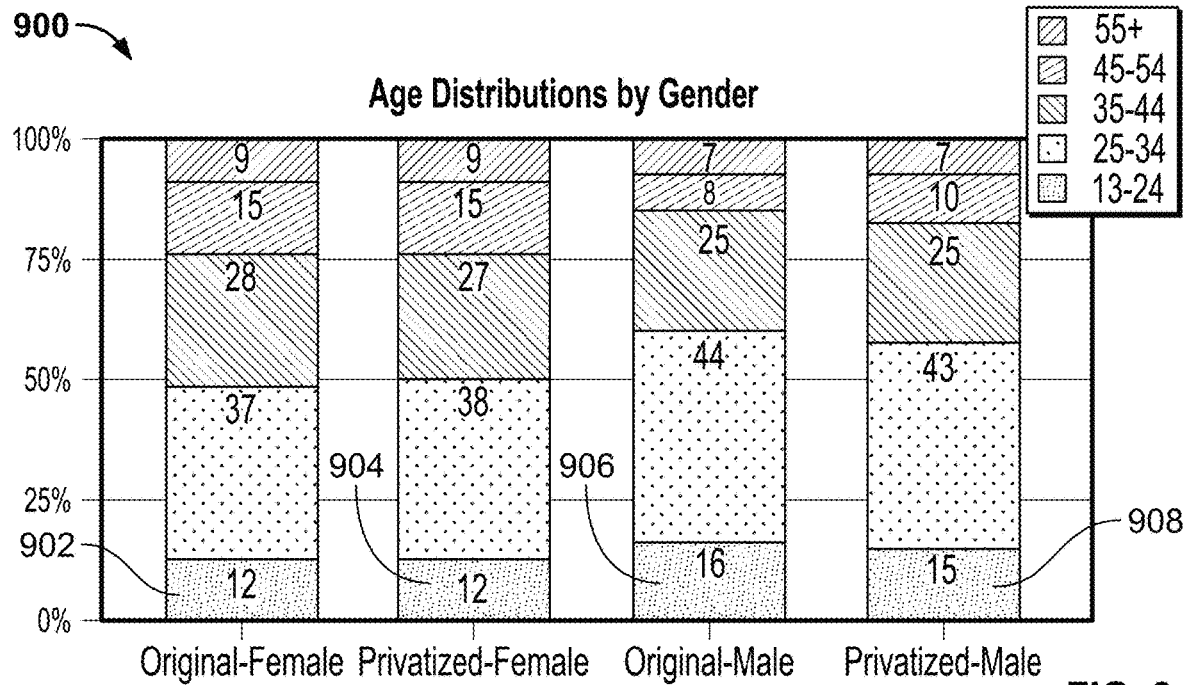

FIG. 9 includes bar graphs 900 that illustrate example obfuscation and/or replacement of gender and age data. As can be seen in FIG. 9, distributions can be maintained after privatization/obfuscation of the consumer data. An example distribution 902 shows original female data while a distribution 904 shows privatized/obfuscated female data. Further, an example distribution 906 shows original male data while distribution 908 shoes privatized/obfuscated male data. Accordingly, the distributions are 902, 906 are not greatly obscured even when privatized. In this example, associations are measured using a Cramer's distribution corresponding to a V-value of 0.12 for the original data and a V-value of 0.10 for privatized data.

Figure 10:
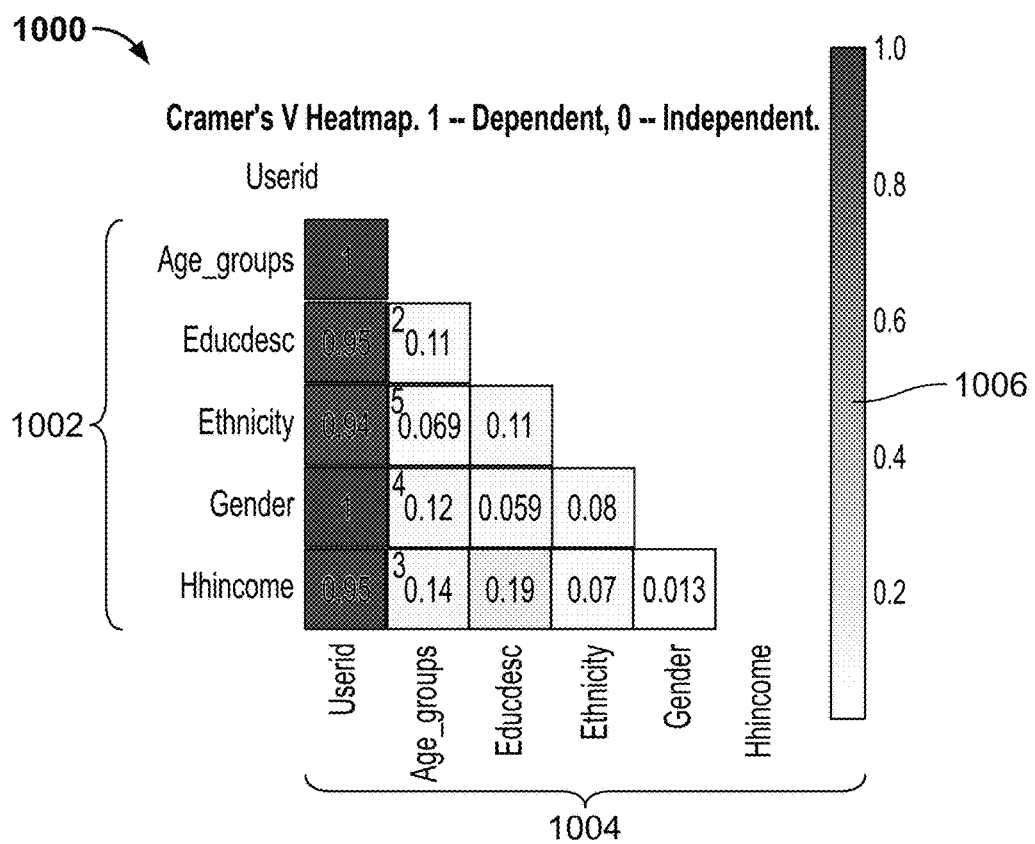

FIG. 10 represents an example Cramer's heatmap 1000 for multiple panelists (e.g., consumer panelists, an entire group of panelists). In particular, the heatmap 1000 represents random replacement of personal descriptors. In this example, first categories 1002 are shown in relation to second categories 1004, with a probability generally indicated by a legend 1006. In this example, values close to 1.0 represent dependencies while values closer to 0.0 represent independent categories. In the illustrated example of FIG. 10, the random replacement of personal descriptors does not significantly affect data distributions.

FIG. 11 illustrates an example comparison of Cramer's heatmap 1102, which includes a correlation analysis performed by the example data obfuscation verifier 212 on original data, and a corresponding Cramer's heatmap 1106, which corresponds to a correlation analysis performed on privatized/obfuscated data (e.g., a replacement rate of 0.3). Accordingly, the privatized data does not significantly affect an analytical determination of overall trends.

Figure 12:
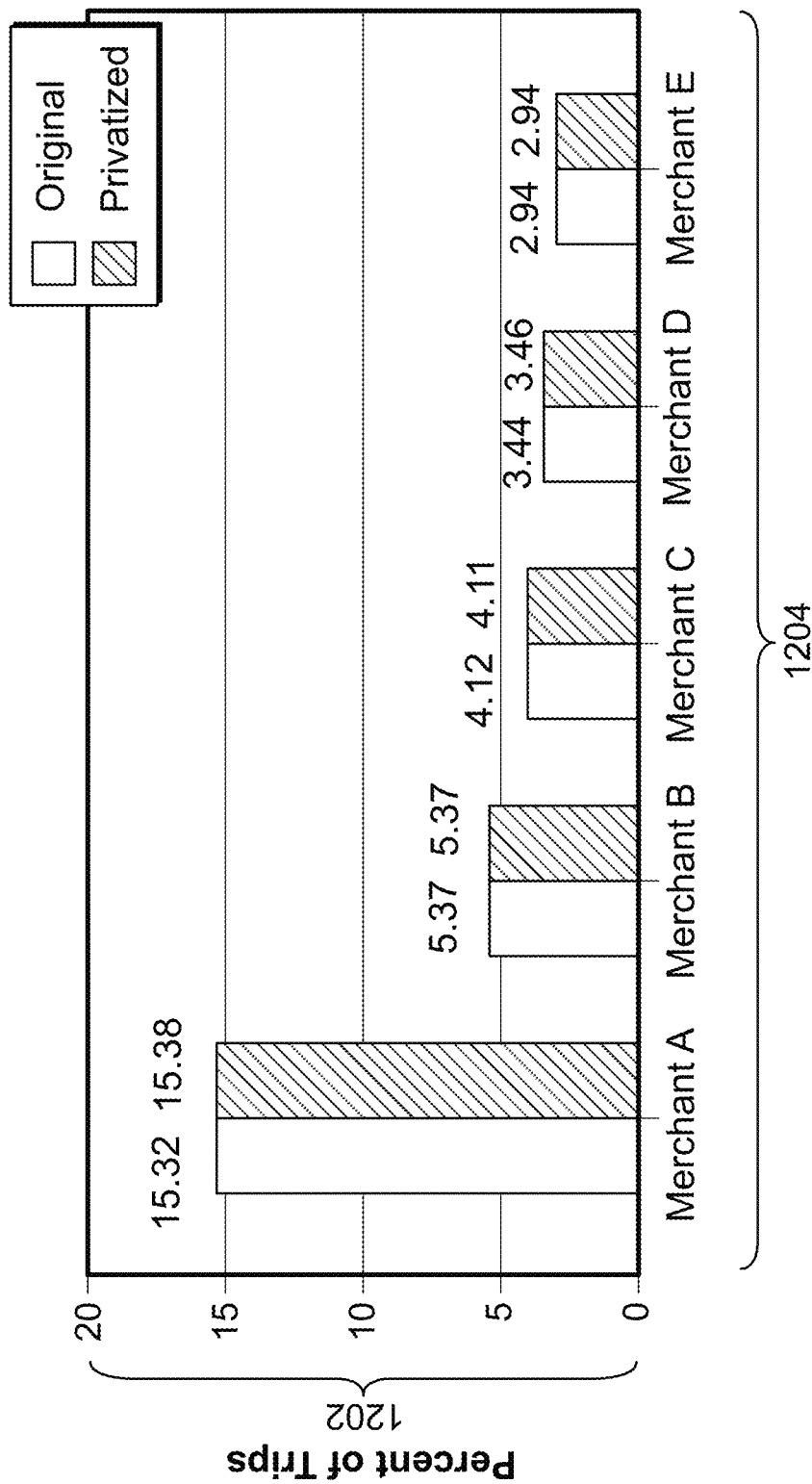

FIG. 12 includes example bar graphs 1200 relating to percent of transactions occurring with low spend merchants. In this example, a vertical axis 1202 corresponds to percentage of trips while a horizontal axis 1204 represents different merchants. As can be seen in the illustrated example of FIG. 12, the original and privatized data do not have significant differences therebetween.

Figures 13, 14:
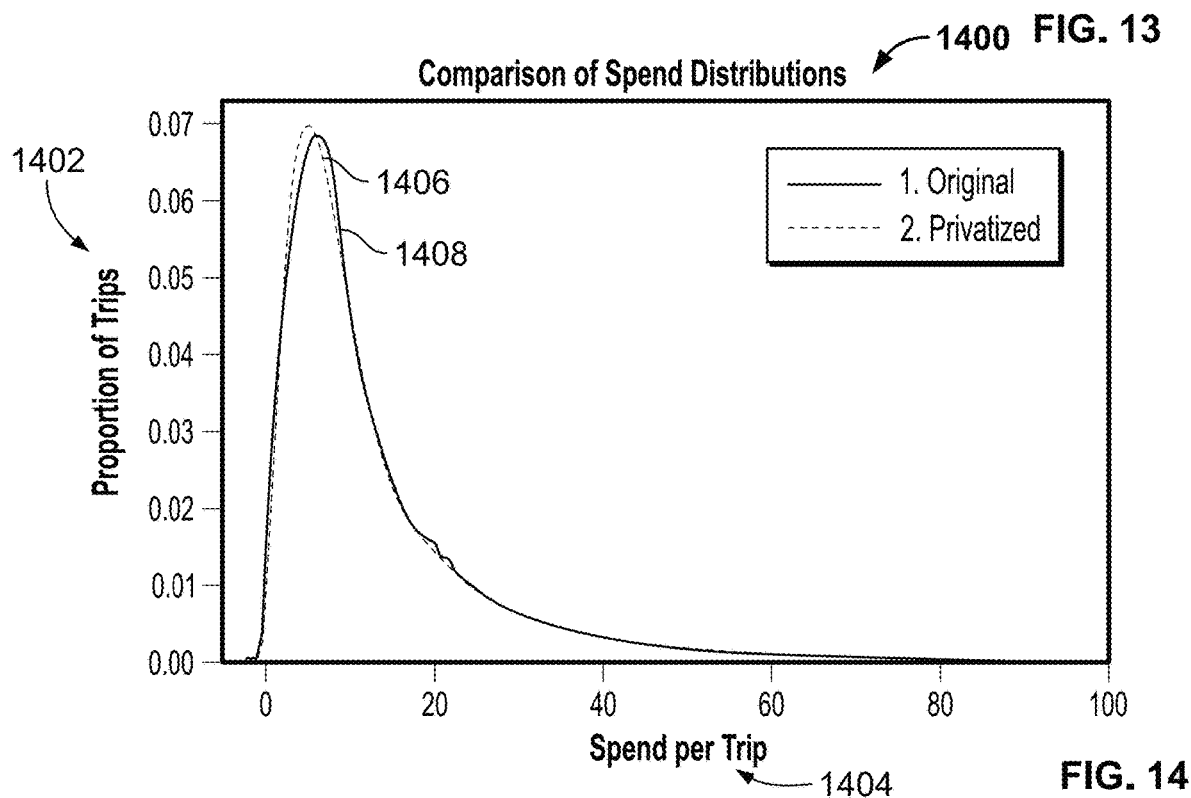

FIG. 13 includes an example table 1300 that represents spending of individuals. Individuals are denoted as user identifications (UserID), represented by a column 1301. According to the illustrated example of FIG. 13, merchants are represented by a column 1302. Further, original spending data is represented by a column 1306 while privatized spending data is shown in column 1308. Further, a ratio representing a difference of the original spending data and the privatized spending data is represented by a column 1310. In this example, noise has been added to spending data by the example data obfuscator 210. However, the privatized data does not significantly vary from the original data.

FIG. 14 includes an example graph 1400 illustrating a comparison of spend distributions, with a vertical axis 1402 representing a proportion of trips and a horizontal axis 1404 representing amount spent per trip. A first curve 1406 represents privatized data while a second curve 1408 represents privatized data. Accordingly, the first curve 1406 and the second curve 1408 do not have significant differences.

Figure 15:
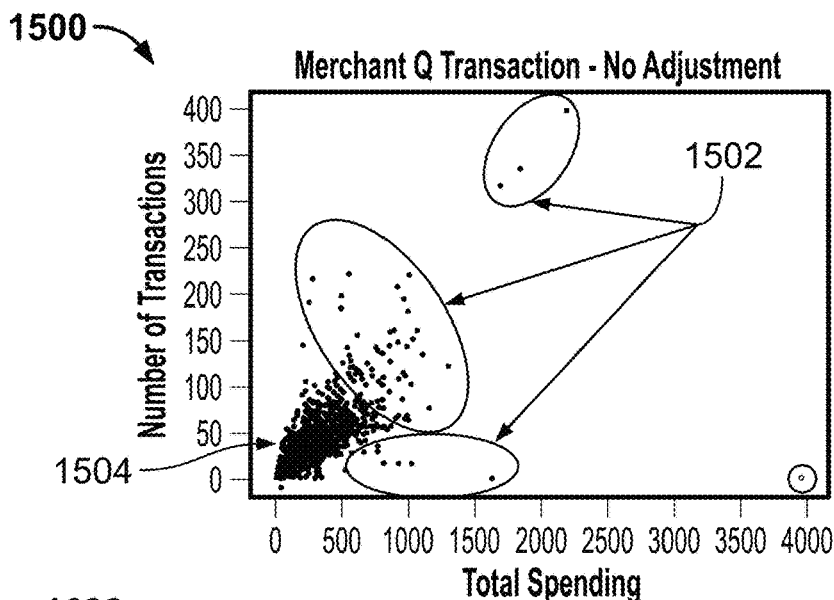

FIG. 15 is an example graph 1500 representing transaction data. Accordingly, outliers 1502 are denoted. The outliers 1502 diverge significantly from a majority of data 1504.

Figure 16:
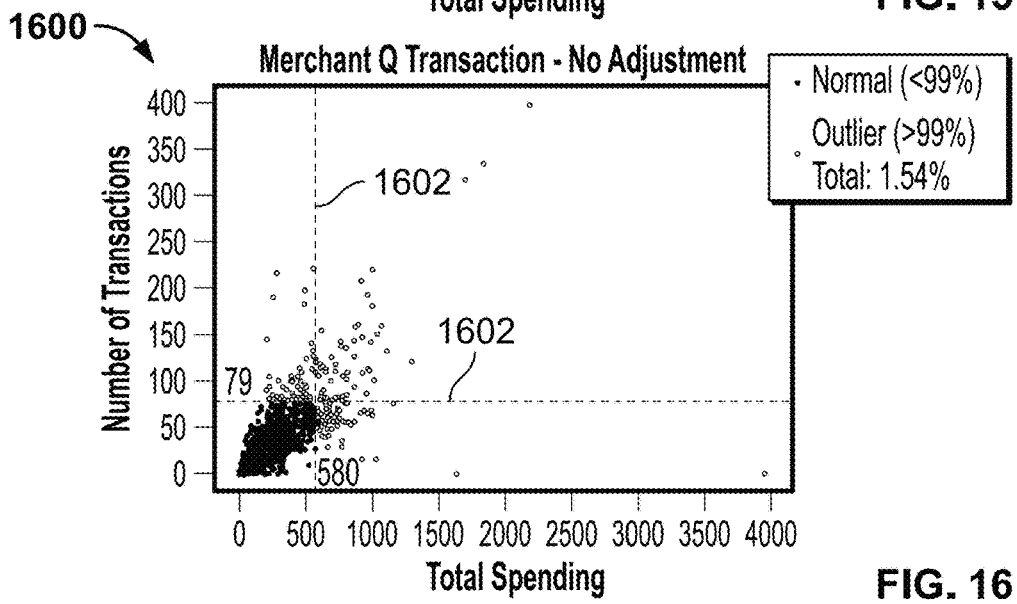

Turning to FIG. 16, an example graph 1600 is shown indicating a region 1602 depicting higher percentiles of data that can be used to identify individuals from their neighbors and/or other panelists based on irregularities of their spending patterns.

Figure 17:
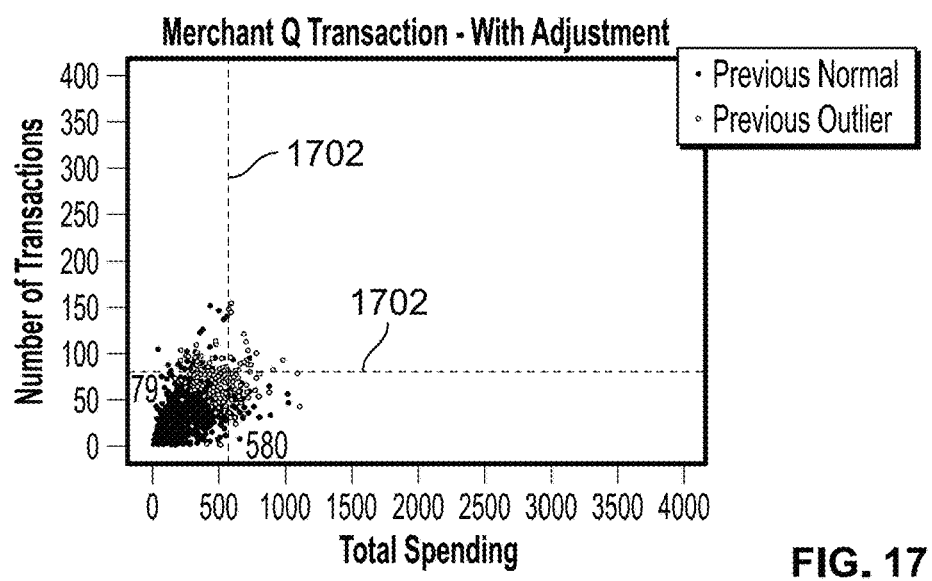

FIG. 17 depicts corresponding example adjusted data from FIGS. 15 and 16. In particular, the aforementioned outliers are eliminated by the example sorter 214 and noise is added to the data by the example data obfuscator 210 to lower a distribution range between the data. In some examples, data in the $99^{th}$ percentile or higher is removed. However, any appropriate criteria or percentile level can be adjusted instead.

As mentioned above, FIGS. 15-17 demonstrate a process in which outlier data is identified and removed or altered in trend analysis by the sorter 214 and/or the data obfuscator 210. In some examples, the outliers are categorized into a first category, including individuals spending more or transacting significantly more than the rest of the population, and a second category, including individuals with a unique or unusual sequence of transactions. The first category can be sorted and/or removed by the example sorter 214 based on at least one of forcing spending and transaction counts closer to a majority of the distribution, adding noise to the transaction counts, and adding noise to spending. Additionally or alternatively, the second category can be sorted and/or removed by the example sorter 214 via merchant replacement and/or added noise.

Figure 18:
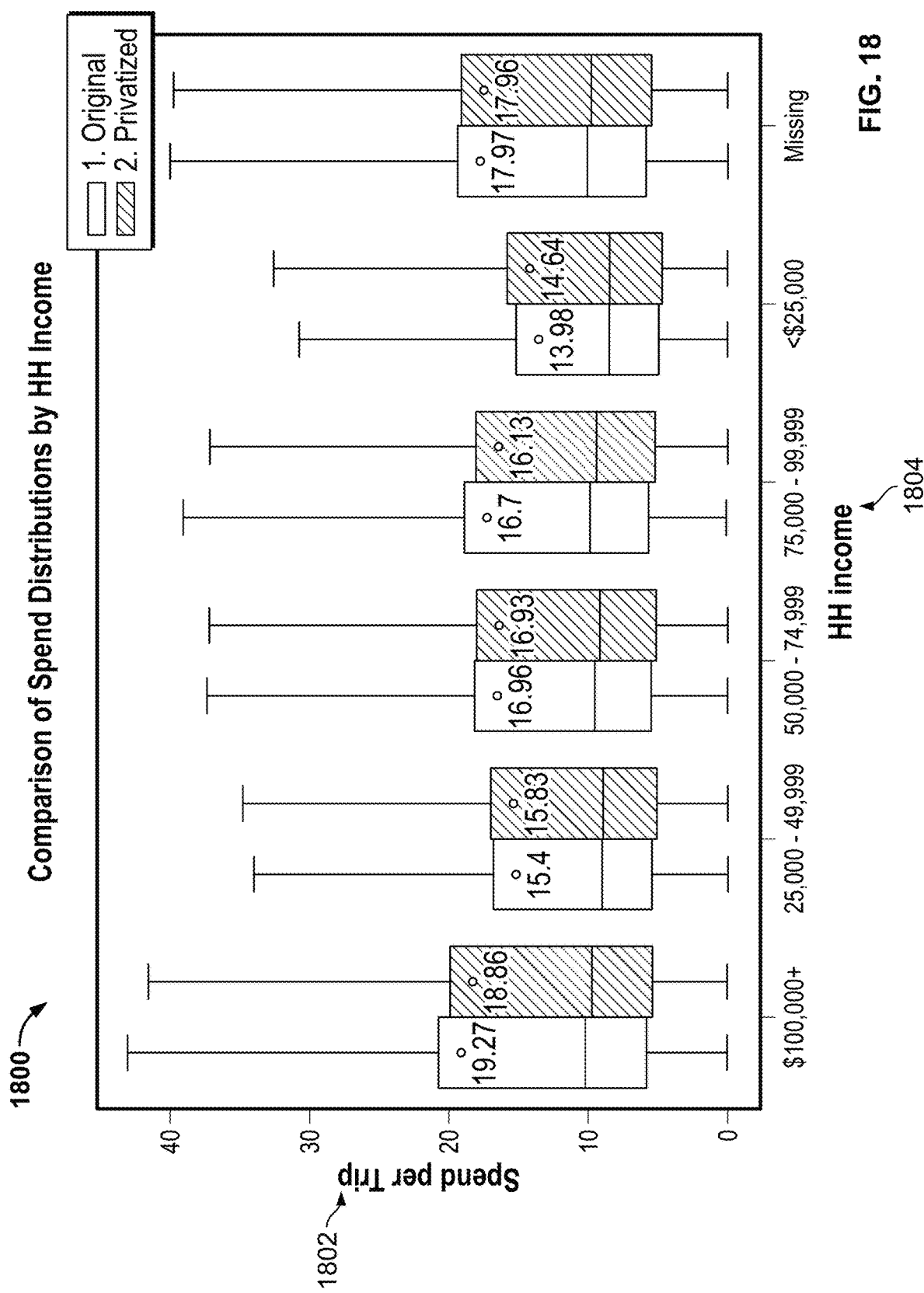

Turning to FIG. 18, an example graph 1800 illustrates spend distribution related to household income. In particular, a vertical axis 1802 indicates money spent per trip while a horizontal axis 1804 indicates household income. Accordingly, privatized data does not vary significantly relative to original data.

Figure 19:
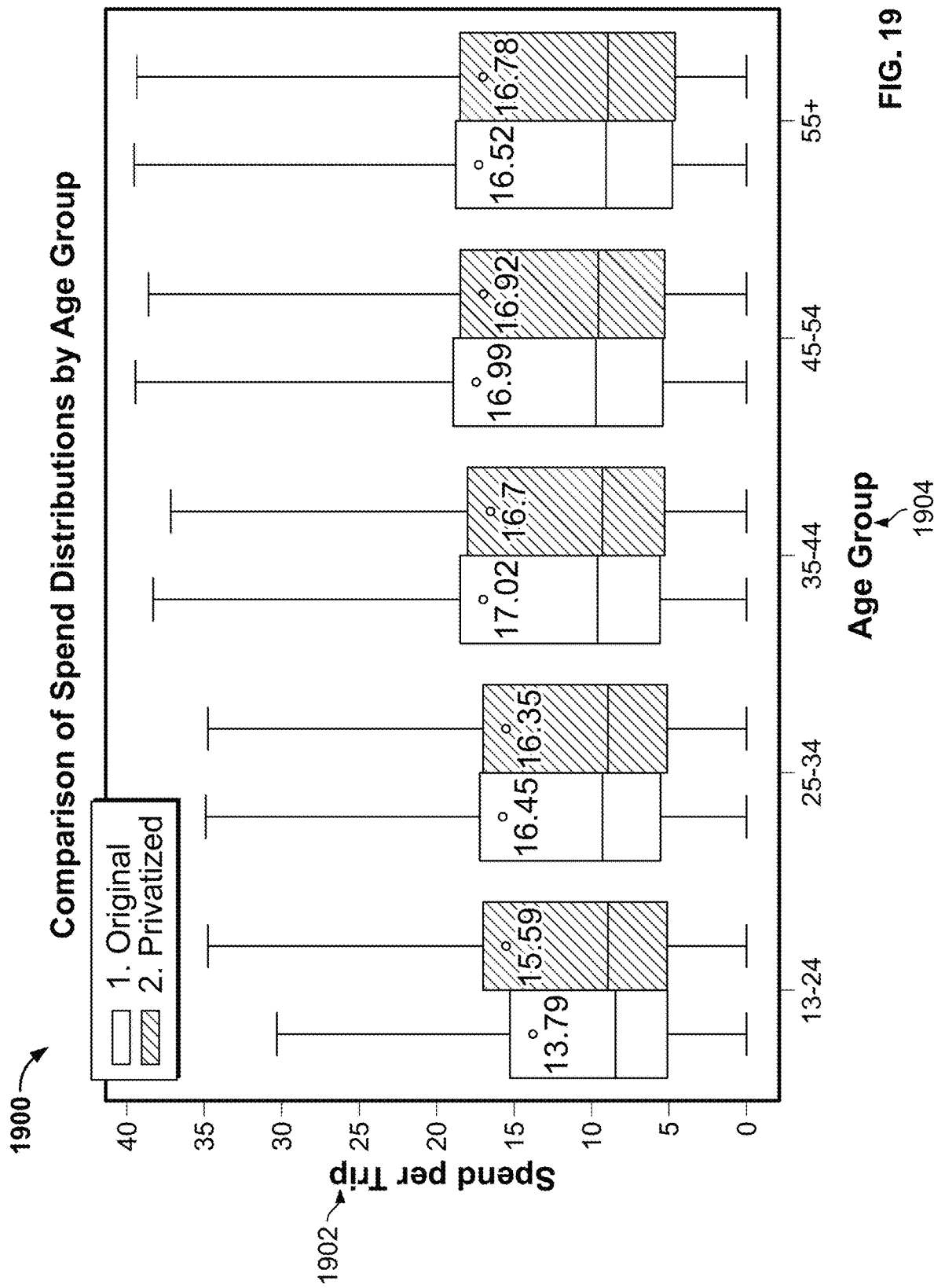

FIG. 19 includes an example graph 1900 that is similar to the graph 1800 of FIG. 18, but illustrates a relationship between spend distribution and age group. A vertical axis 1902 corresponds to money spent per trip and horizontal axis 1904 represents different age groups. As can be seen in the example of FIG. 19, the privatized data does not vary significantly from the original data.

Figure 20:
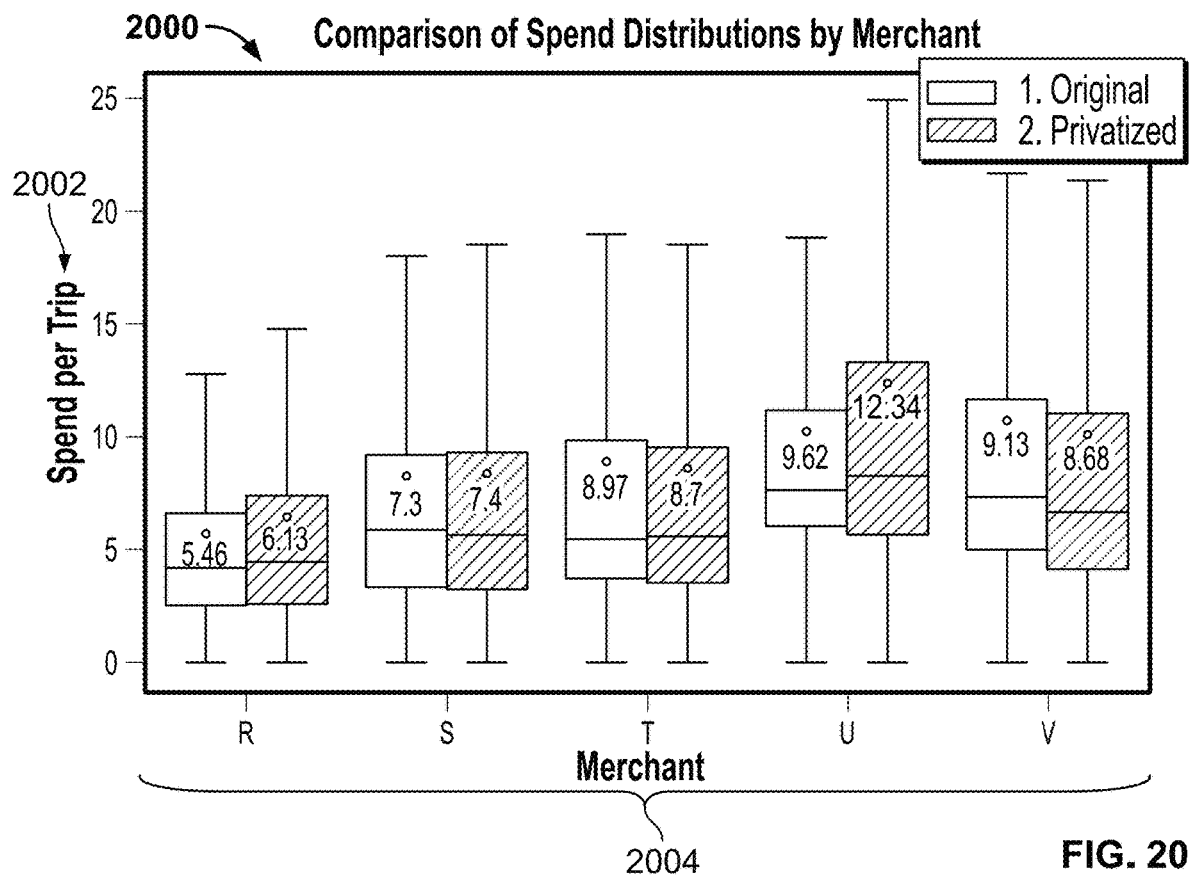

FIG. 20 includes an example graph 2000 that relates spend distributions with merchant. The graph 2000 includes a vertical axis 2002 that represents money spent per trip while a horizontal axis 2004 represents different merchants. In regard to merchant relationships, the spend data does not vary significantly between privatized and original data.

Figure 21:
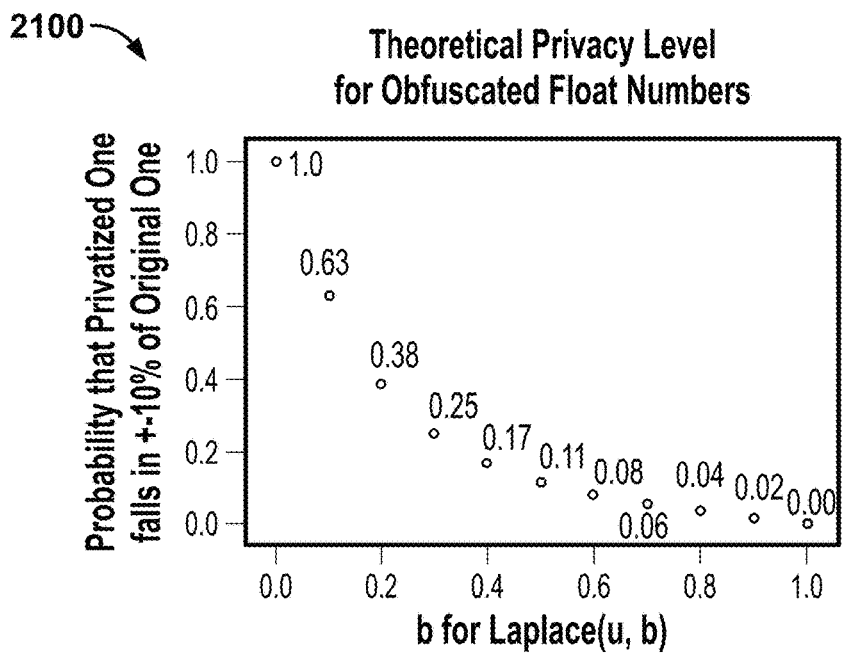
FIGS. 21-23 illustrate example privacy metrics that can be implemented in examples disclosed herein.
Figure 22:
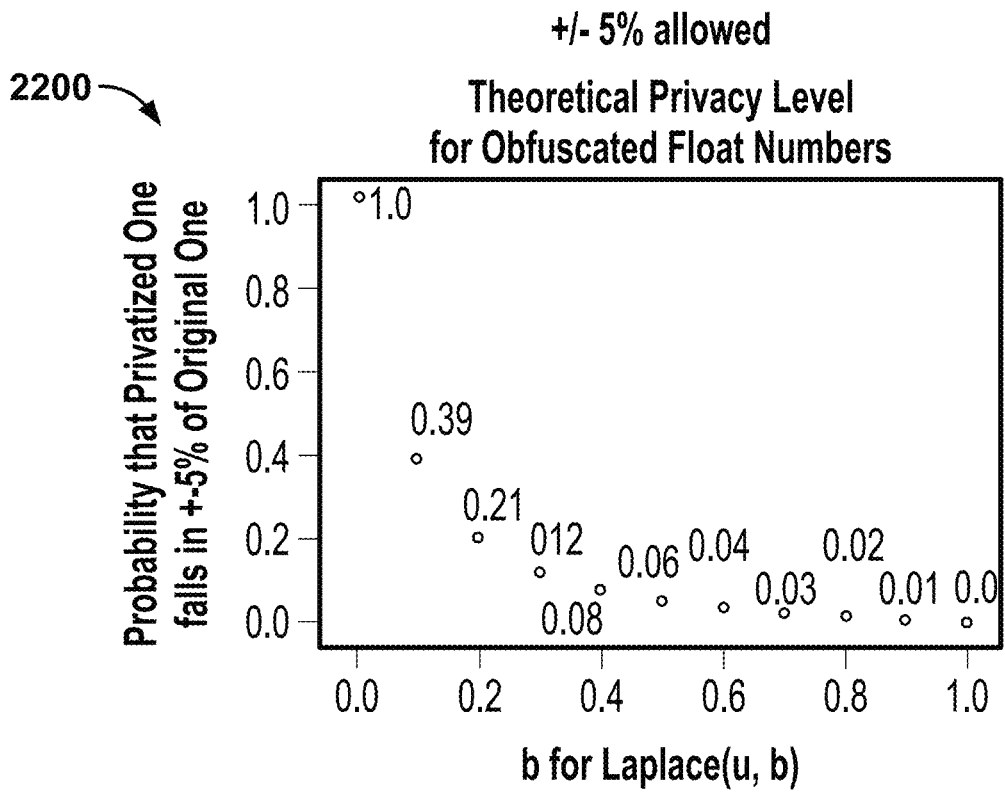
Figure 23:
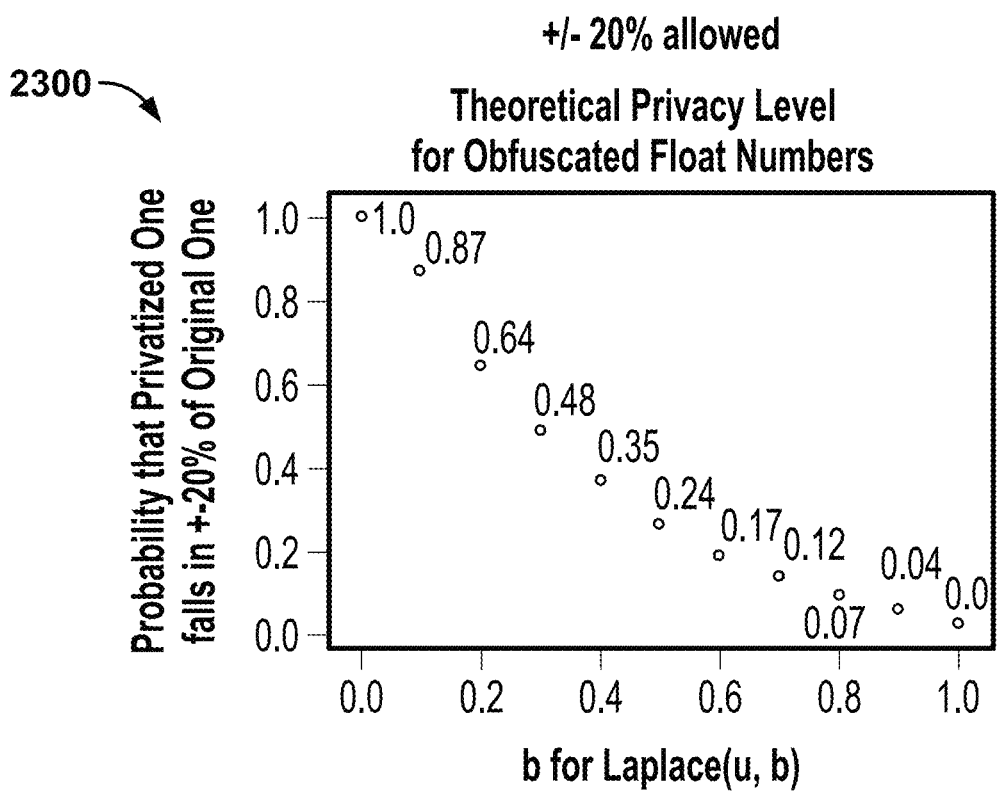

FIGS. 21-23 illustrate privacy metrics that can be implemented in examples disclosed herein. As used herein, privacy is defined as subtracting a probability ratio from 1 (e.g., a 1% likelihood when the privacy level is 99%). Based on personal descriptors, a lower bound of privacy can be calculated by the example data obfuscator 210 and/or the example data obfuscation verifier 212 to combine both k-anonymity and the replacement rate in a manner consistent with example Equation 5 below:

$$Privacy_{bound} = 1 - \left(\frac{1}{k}\right)(1 - RR)^{number\ of\ descriptors} \quad (5)$$

where k=minimum number individuals in a descriptor classification, where RR=replacement rate employed for changing descriptors, and where RR is increased for any individual whose combination of descriptors exceeds k. Accordingly, in some examples, based on shopping or exposure history, the lower bound of privacy depends on the allowed variation in values and/or the Laplace variance and the number of instances (transactions) considered. In some examples, the example data obfuscator 210 and/or the example data obfuscation verifier 212 calculates with a cumulative distribution function (CDF) in a manner consistent with example Equation 6 below:

$$Privacy_{bound}(+/-10\%, m\ instances) = \quad (6)$$
$$1 - f[(CDF(1.1) - CDF(0.9))^m, m] = 1 - f[0.25; 3]$$

In some examples, finding multiple transactions that are plausible can lower a privacy level. Accordingly, deriving f[ ] shown above in example Equation 6 can be desirable.

Further, an example Equation 7 illustrates a manner consistent with the example data obfuscator 210 adding noise for an allowed variation of 10%:

$$e^{ln(new\_price)} = e^{ln(old\_price)+Y}, \text{ where } Y \sim Laplace(u, b) \quad (7)$$
$$ratio = \frac{new\_price}{old\_price} = \frac{e^{ln(new\_price)}}{e^{ln(old\_price)}} = e^{ln(new\_price)+T-ln(old\_price)} = e^Y$$

Accordingly, example Equation 8 yields:

$$0.9<ratio<1.10 ==> 0.90<e^Y<1.10 ==> ln(0.90)<Y<ln(1.10) \quad (8)$$

Based on an example obfuscation rule, example Equation 9 is shown below with a cumulative distribution function:

$$CDF(Y) = \frac{1}{2} + \frac{1}{2} * sgn(x - \mu)(1 - e^{-\frac{|x-\mu|}{b}}) \quad (9)$$

As a result, setting b equal to 0.3 and μ to ln(0.91), will yield example Equation 10:

$$CDF(Y=ln(1.10))-CDF(Y=ln(0.90))=0.25 \quad (10)$$

In this example, a probability that a ratio is between 0.9 and 1.1 using the cumulative distribution function of Laplace.

Turning to FIG. 21, an example graph 2100 shows a relationship between a theoretical privacy, and a Laplace variation, b, as described above. Accordingly, as b increases, more privacy protection is afforded.

FIG. 22 includes an example graph 2200 that illustrates an effect on privacy when an allowed variation in purchasing is approximately +/−5%.

Turning to FIG. 23, an example graph 2300 illustrating an effect of privacy corresponding to an allowed variation of +/−20% with the identical b value of FIG. 22 is shown.

Figure 24:
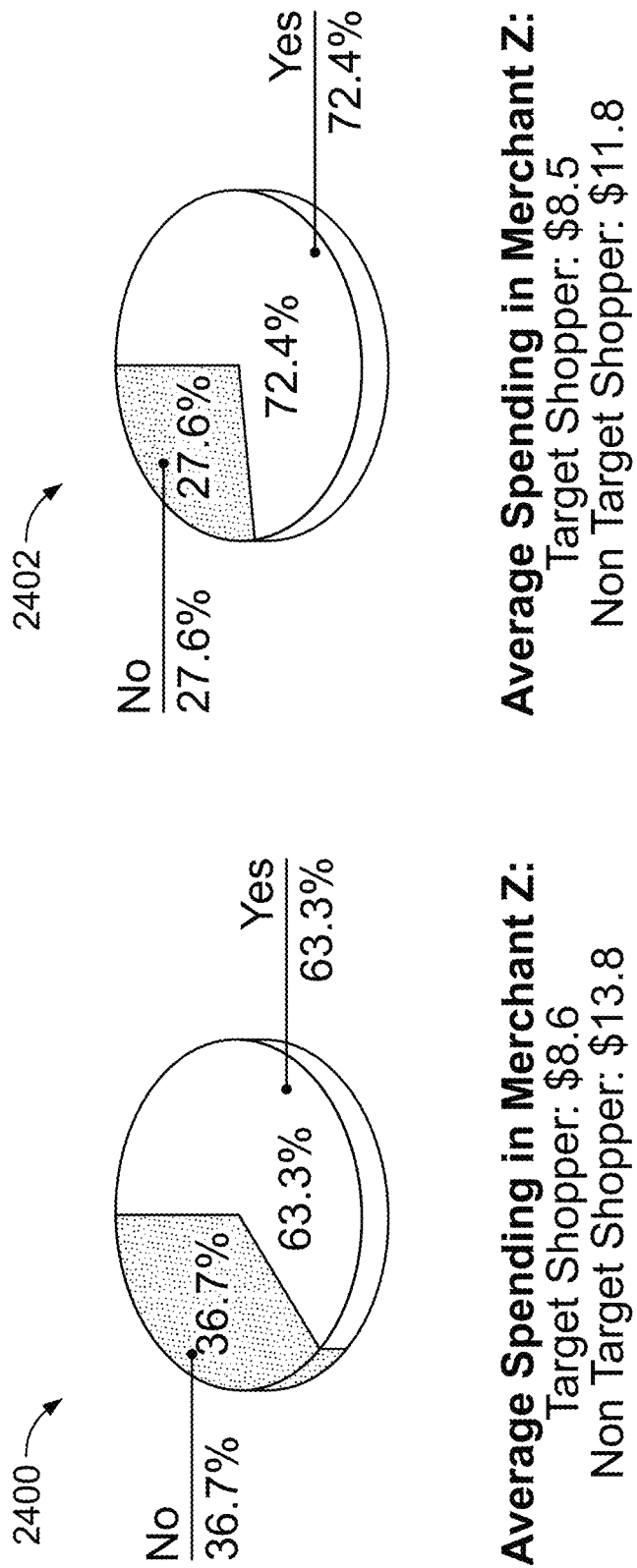
FIGS. 24-28 illustrate testing usefulness of privatized data that can be implemented in examples disclosed herein.

FIG. 24 illustrates privatized and original data from a context of a buyer group comparison. In particular, an example graph 2400 illustrates a distribution of unaltered data including penetration rate between two stores and average spending. In contrast, example graph 2402 illustrates a distribution of privatized data and corresponding penetration rate. Accordingly, in terms of the buyer group comparison, the privatized data does not significantly alter overall trends or calculated data.

Figure 25:
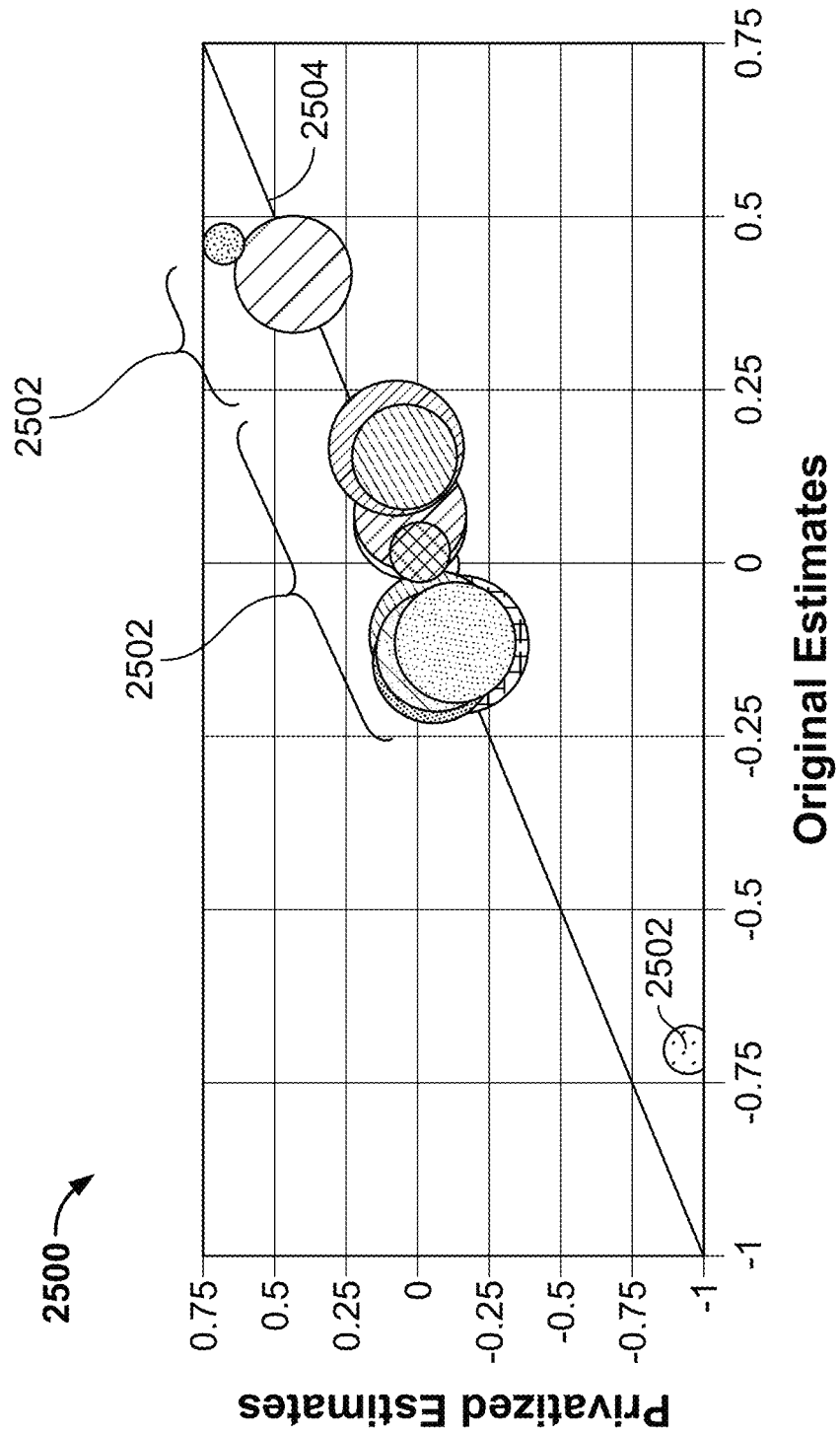
Figure 26:
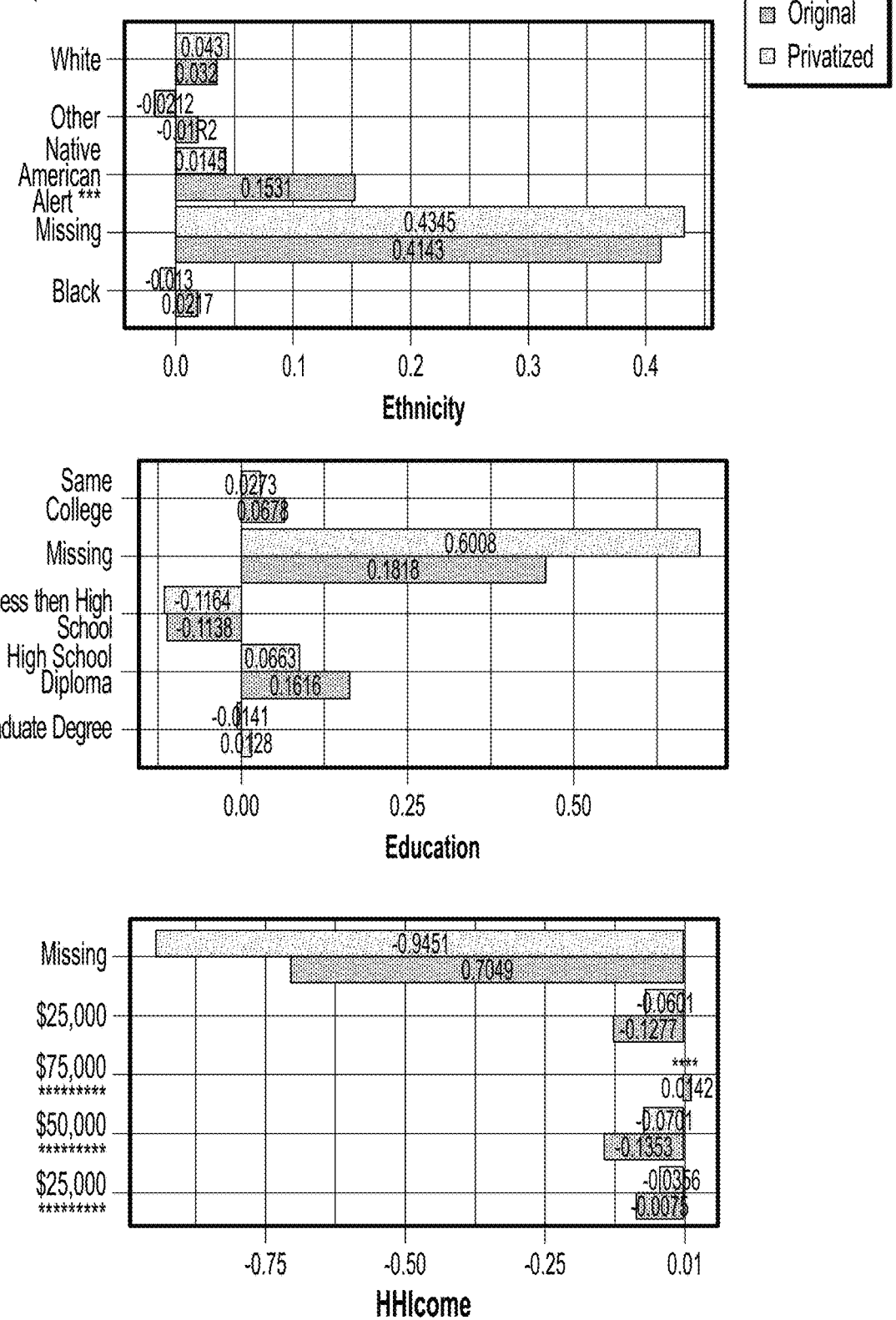
Figure 26:
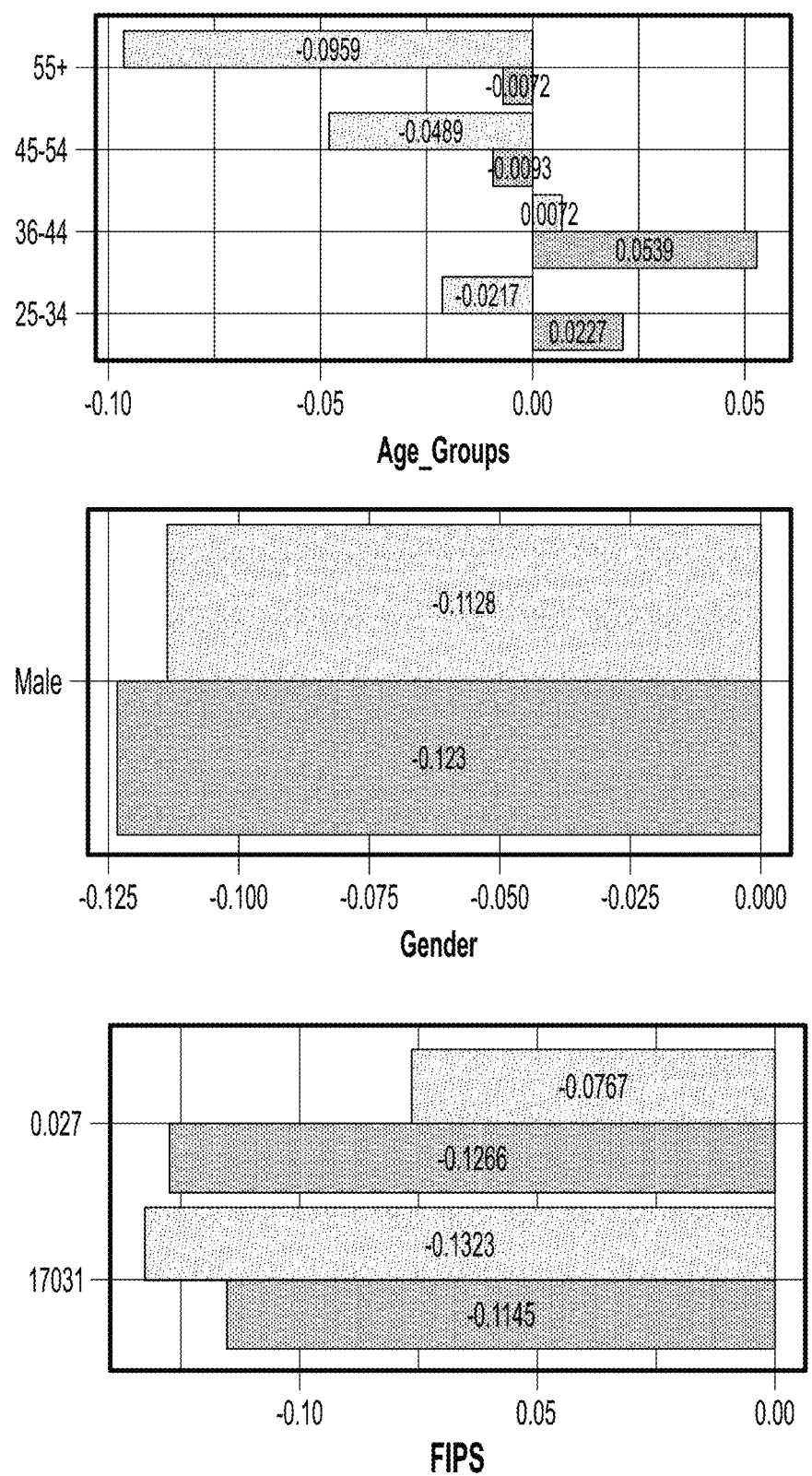

FIG. 25 includes an example graph 2500 to illustrate use of a linear regression analysis performed by the example data obfuscation verifier 212 and/or the example data obfuscator 210 to test a usefulness of privatized data. In the illustrated example of FIG. 25, circles 2502 represent significance. Further, a line 2504 represents a result of the linear regression analysis. In some examples, the linear regression analysis is employed to evaluate purchase amounts per trip FIG. 26 includes multiple graphs 2600 demonstrating additional example linear regression results from an analysis performed by the example data obfuscation verifier 212 and/or the example data obfuscator 210. In the illustrated example of FIG. 26, a high correlation is seen between original and privatized data. Further, in this example, the largest relative differences are seen in connection with insignificant or missing value descriptors.

Figure 27:
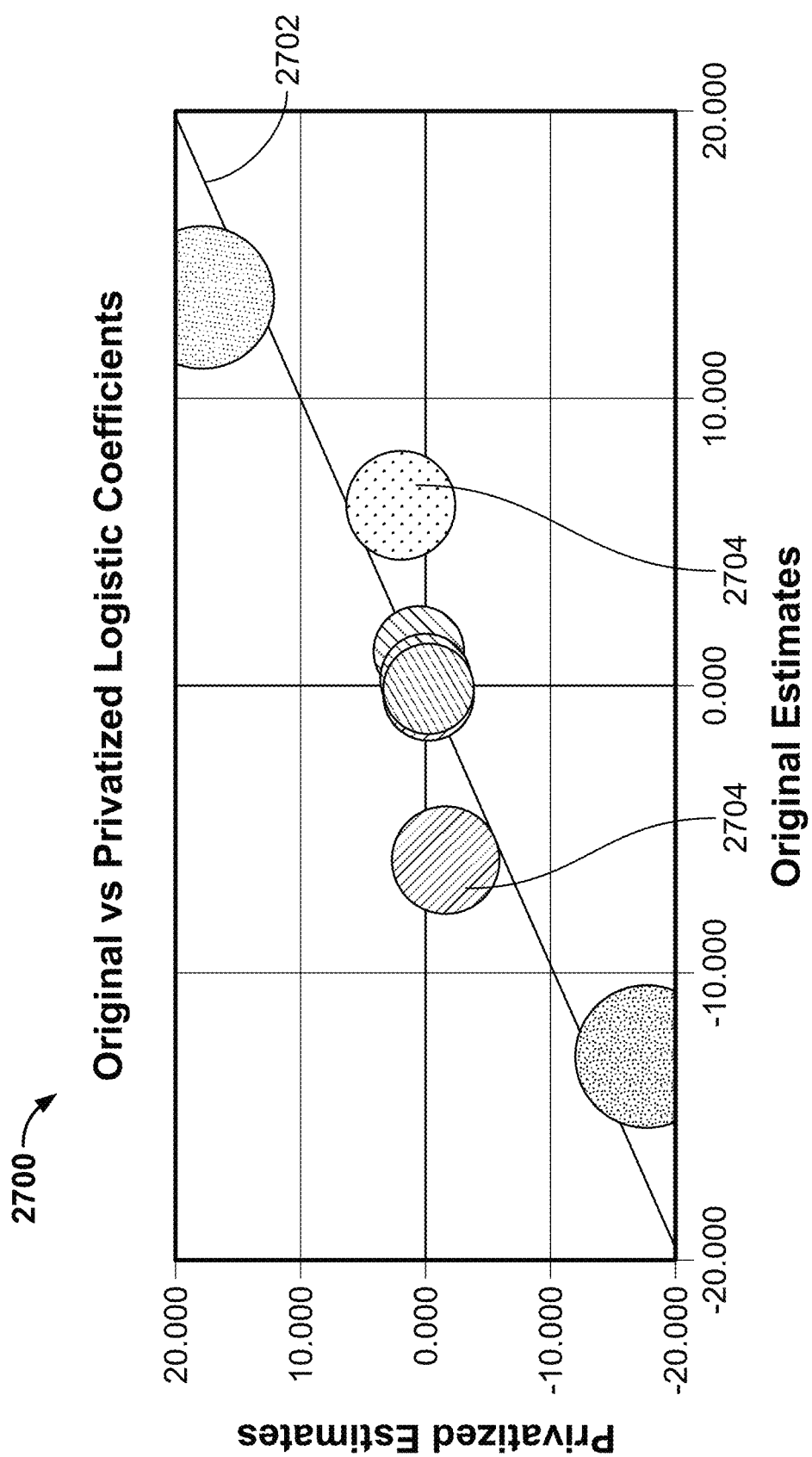

Turning to FIG. 27, an example graph 2700 is shown. The graph 2700 corresponds to a logistic regression from an analysis performed by the example data obfuscation verifier 212 and/or the example data obfuscator 210. In this example, a regression line 2702 is shown with a correlation of 0.94. Further, outliers 2704 are shown away from the aforementioned line 2702. In particular, the outliers 2704 correspond to missing descriptor values.

Figure 28:
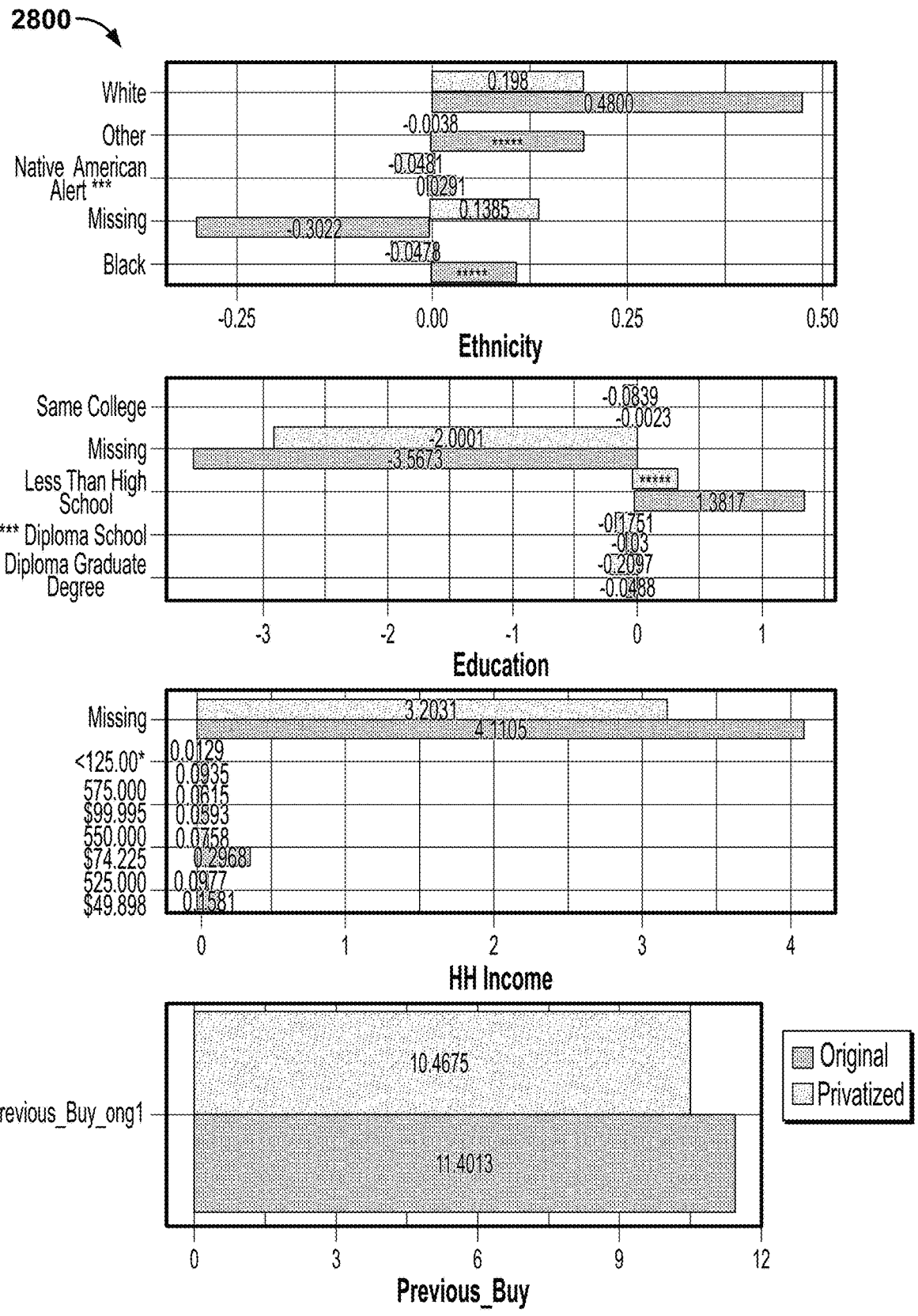
Figure 28:
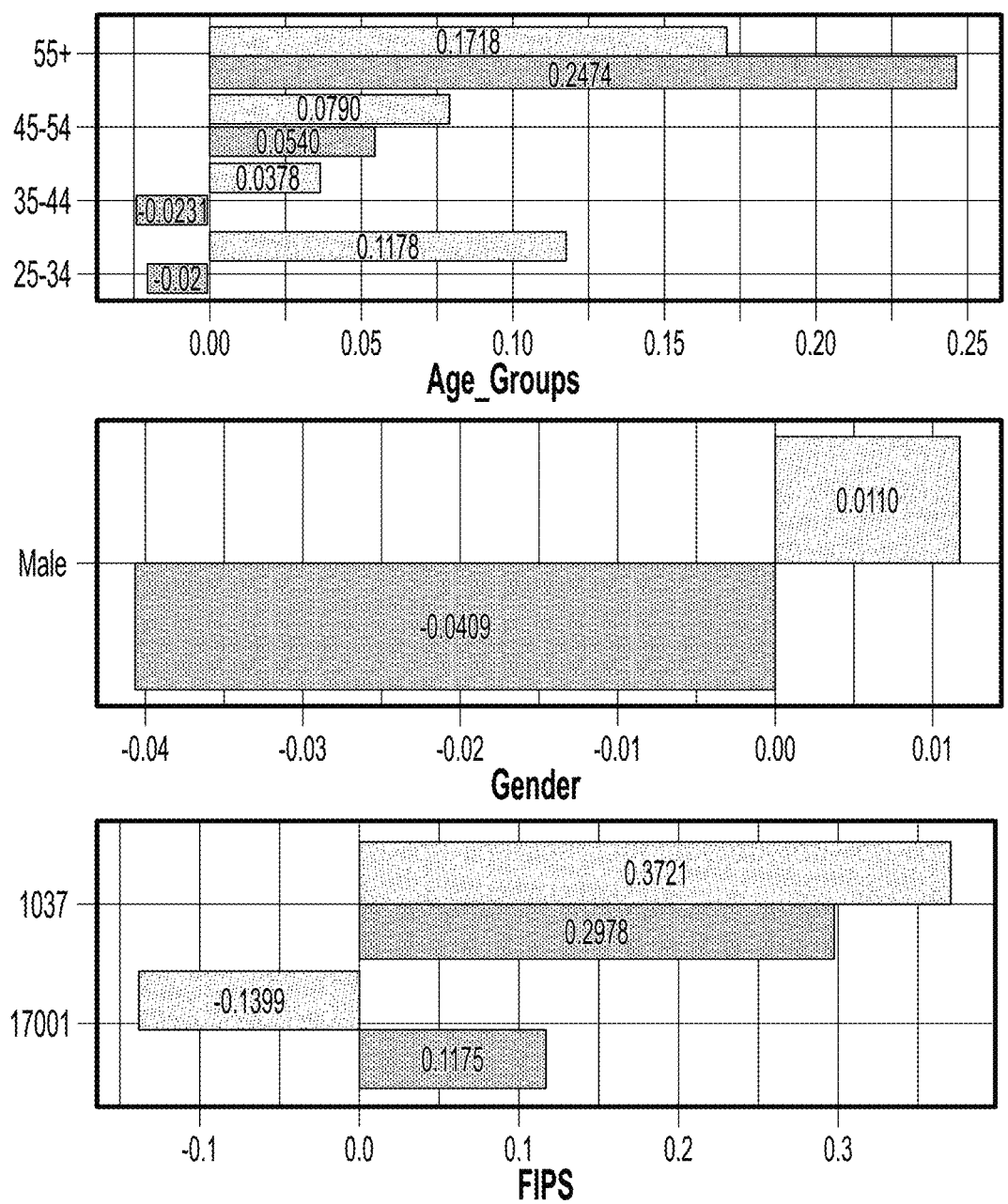

FIGS. 24-28 illustrate testing usefulness of privatized data that can be implemented in examples disclosed herein. FIG. 28 shows multiple graphs 2800 demonstrating additional logistic regression results from an analysis performed by the example data obfuscation verifier 212 that demonstrate differences between original and privatized data. Accordingly, larger magnitude variables and/or descriptors remain significant.

Figure 29:
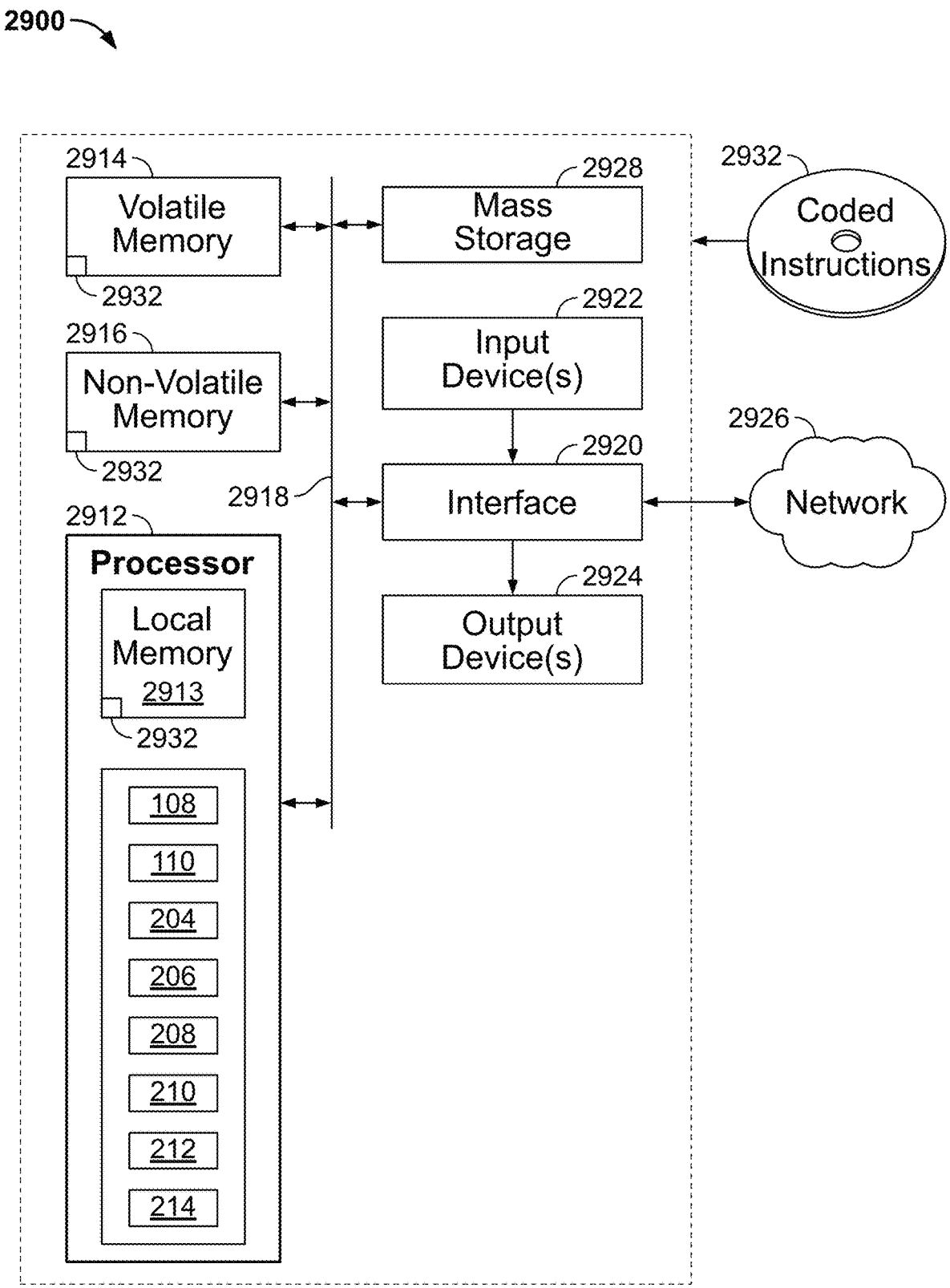
FIG. 29 is a block diagram of an example processing platform structured to execute the instructions of FIG. 3 to implement the example privatization data process architecture of FIG. 1 and/or the example data privatization system of FIG. 2.

FIG. 29 is a block diagram of an example processor platform 2900 structured to execute the instructions of FIGS. 3-5 to implement the data privatization system 200 of FIG. 2. The processor platform 2900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 2900 of the illustrated example includes a processor 2912. The processor 2912 of the illustrated example is hardware. For example, the processor 2912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example transformation engine 108, the example synthetic engine 110, the example consumer data acquirer 204, the example calculator 206, the example selector 208, the example data obfuscator 210, the example data obfuscation verifier 212 and the example sorter 214.

The processor 2912 of the illustrated example includes a local memory 2913 (e.g., a cache). The processor 2912 of the illustrated example is in communication with a main memory including a volatile memory 2914 and a non-volatile memory 2916 via a bus 2918. The volatile memory 2914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2916 may be implemented by flash memory and/or any other desired type of memory device. Access to the main memory 2914, 2916 is controlled by a memory controller.

The processor platform 2900 of the illustrated example also includes an interface circuit 2920. The interface circuit 2920 may be implemented by any type of interface standard, such as an Ethernet interface, a universal serial bus (USB), a Bluetooth® interface, a near field communication (NFC) interface, and/or a PCI express interface.

In the illustrated example, one or more input devices 2922 are connected to the interface circuit 2920. The input device(s) 2922 permit(s) a user to enter data and/or commands into the processor 2912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2924 are also connected to the interface circuit 2920 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2920 of the illustrated example, thus, typically includes a graphics driver card, a graphics driver chip and/or a graphics driver processor.

The interface circuit 2920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2900 of the illustrated example also includes one or more mass storage devices 2928 for storing software and/or data. Examples of such mass storage devices 2928 include floppy disk drives, hard drive disks, compact disk drives, Blu-ray disk drives, redundant array of independent disks (RAID) systems, and digital versatile disk (DVD) drives.

The machine executable instructions 2932 of FIGS. 3-5 may be stored in the mass storage device 2928, in the volatile memory 2914, in the non-volatile memory 2916, and/or on a removable non-transitory computer readable storage medium such as a CD or DVD.

From the foregoing, it will be appreciated that example methods, apparatus and articles of manufacture have been disclosed that enable obfuscation of private or confidential data to a requisite/defined degree without significantly skewing overall analytical results. The disclosed methods, apparatus and articles of manufacture improve the efficiency of using a computing device by generating an obfuscation model and/or data converter that can efficiently privatize later-provided data based on a previous analysis of consumer data. In other words, examples disclosed herein enable a model/data converter that can be generated using an analysis of consumer data. The disclosed methods, apparatus and articles of manufacture are accordingly directed to one or more improvement(s) in the functioning of a computer.

Example 1 includes an apparatus having a consumer data acquirer to collect original data corresponding to (a) confidential information associated with consumers and (b) behavior information associated with the consumers, and a data obfuscator. The data obfuscator is to determine a degree to which the original data is to be obfuscated and a type of obfuscation to be applied to the original data based on the original data, generate obfuscation adjustments of the original data based on the degree and the type and generate obfuscation adjustments of the original data based on the degree and the type.

Example 2 includes the apparatus of Example 1, and further includes an obfuscation verifier to verify that the obfuscation adjustments exceed an obfuscation adjustment threshold value, and verify that a similarity index value between first calculated data that is associated with the original data and second calculated data that is associated with obfuscated data exceeds a similarity threshold, where the obfuscated data is generated by applying the obfuscation adjustments to the original data.

Example 3 includes the apparatus of Example 1, where the obfuscation model is generated by applying the obfuscation adjustments to (a) the confidential information and (b) the behavior information.

Example 4 includes the apparatus of Example 1, and further includes a selector to select a set of the confidential information associated with at least one of the consumers, and a calculator to calculate a likelihood of determining an identity of the at least one of the consumers based on the set of the confidential information and the behavior information, where the data obfuscator is to generate the obfuscation adjustments in response to the likelihood satisfying a threshold criteria.

Example 5 includes the apparatus of Example 1, where the obfuscation model is an obfuscation data converter to be applied to another set of confidential information.

Example 6 includes the apparatus of Example 1, where the obfuscation adjustments include noise to be applied to the original data.

Example 7 includes the apparatus of Example 6, where the noise includes multiplicative Laplace noise or Poisson noise.

Example 8 includes the apparatus of Example 1, and further includes a sorter to remove outliers from the original data.

Example 9 includes the apparatus of Example 1, where the obfuscation adjustments include utilizing conditional entropy.

Example 10 includes a method including collecting, by instructions executed with a processor, original data corresponding to (a) confidential information associated with consumers and (b) behavior information associated with the consumers, determining, by instructions executed with the processor, a degree to which the original data is to be obfuscated and a type of obfuscation to be applied to the original data based on the original data, generating, by instructions executed with the processor, obfuscation adjustments of the original data based on the degree and the type, and generating, by instructions executed with the processor, an obfuscation model based on the obfuscation adjustments.

Example 11 includes the method of Example 10, and further includes verifying, by instructions executed with the processor, that the obfuscation adjustments exceed an obfuscation adjustment threshold value, and verifying, by instructions executed with the processor, that a similarity index value between first calculated data that is associated with the original data and second calculated data that is associated with obfuscated data exceeds a similarity threshold, where the obfuscated data is generated by applying the obfuscation adjustments to the original data.

Example 12 includes the method of Example 10, where the obfuscation model is generated by applying the obfuscation adjustments to (a) the confidential information and (b) the behavior information.

Example 13 includes the method of Example 10, and further includes selecting, by instructions executed with the processor, a set of the confidential information associated with at least one of the consumers, and calculating, by instructions executed with the processor, a likelihood of determining an identity of the at least one of the consumers based on the set of the confidential information and the behavior information, where the obfuscation adjustments are generated in response to the likelihood satisfying a threshold criteria.

Example 14 includes the method of Example 10, where the obfuscation model is an obfuscation data converter to be applied to another set of confidential information.

Example 15 includes the method of Example 10, where the obfuscation adjustments include noise to be applied to the original data.

Example 16 includes the method of Example 15, where the noise includes multiplicative Laplace noise or Poisson noise.

Example 17 includes the method of Example 10, and further includes sorting, by instructions executed with the processor, to remove outliers from the original data.

Example 18 includes the method of Example 10, where the obfuscation adjustments include utilizing conditional entropy.

Example 19 includes tangible machine readable medium comprising instructions, which when executed, cause a processor to at least collect original data corresponding to (a) confidential information associated with consumers and (b) behavior information associated with the consumers, determine a degree to which the original data is to be obfuscated and a type of obfuscation to be applied to the original data based on the original data, generate obfuscation adjustments of the original data based on the degree and the type, and generate an obfuscation model based on the obfuscation adjustments.

Example 20 includes the tangible machine readable medium of Example 19, where the processor is caused to verify that the obfuscation adjustments exceed an obfuscation adjustment threshold value, and verify that a similarity index value between first calculated data that is associated with the original data and second calculated data that is associated with obfuscated data exceeds a similarity threshold, where the obfuscated data is generated by applying the obfuscation adjustments to the original data.

Example 21 includes the tangible machine readable medium of Example 19, where the obfuscation model is generated by applying the obfuscation adjustments to (a) the confidential information and (b) the behavior information.

Example 22 includes the tangible machine readable medium of Example 19, where the processor is caused to select a set of the confidential information associated with at least one of the consumers, and calculate a likelihood of determining an identity of the at least one of the consumers based on the set of the confidential information and the behavior information, where the obfuscation adjustments are generated in response to the likelihood satisfying a threshold criteria.

Example 23 includes the tangible machine readable medium of Example 19, where the obfuscation model is an obfuscation data converter to be applied to another set of confidential information.

Example 24 includes the tangible machine readable medium of Example 19, where the obfuscation adjustments include noise to be applied to the original data.

Example 25 includes the tangible machine readable medium of Example 24, where the noise includes multiplicative Laplace noise or Poisson noise.

Example 26 includes the tangible machine readable medium of Example 19, where the processor is caused to sort the original data to remove outliers.

Example 27 includes the tangible machine readable medium of Example 19, where the obfuscation adjustments include utilizing conditional entropy.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a consumer data acquirer to collect original data corresponding to (a) confidential information associated with consumers and (b) behavior information associated with the consumers; and
    a data obfuscator to:
        determine a degree to which the original data is to be obfuscated and a type of obfuscation to be applied to the original data based on (i) a degree of privacy and (ii) a degree of similarity between the original data and obfuscated data,
        determine if a threshold level of the degree of privacy is met;
        in response to the threshold level of the degree of privacy not being met, refrain from generating the obfuscation adjustments;
        in response to the threshold level of the degree of privacy being met, generate obfuscation adjustments of the original data based on the determined degree to which the original data is to be obfuscated and the type; and
        generate an obfuscation model based on the obfuscation adjustments.

2. The apparatus as defined in claim 1, wherein the data obfuscator is to apply the obfuscation adjustments to the original data to generate obfuscated data and further including an obfuscation verifier to:
    verify that the obfuscation adjustments exceed an obfuscation adjustment threshold value; and
    verify that a similarity index value between first calculated data that is associated with the original data and second calculated data that is associated with the obfuscated data exceeds a similarity threshold.

3. The apparatus as defined in claim 1, wherein the data obfuscator is to generate the obfuscation model by applying the obfuscation adjustments to (a) the confidential information and (b) the behavior information.

4. The apparatus as defined in claim 1, further including:
    a selector to select a set of the confidential information associated with at least one of the consumers; and
    a calculator to calculate a likelihood of determining an identity of the at least one of the consumers based on the set of the confidential information and the behavior information, wherein the data obfuscator is to generate the obfuscation adjustments in response to the likelihood satisfying a threshold criteria.

5. The apparatus as defined in claim 1, wherein the obfuscation model is an obfuscation data converter to be applied to another set of confidential information.

6. The apparatus as defined in claim 1, wherein the obfuscation adjustments include noise to be applied to the original data.

7. The apparatus as defined in claim 6, wherein the noise includes multiplicative Laplace noise or Poisson noise.

8. The apparatus as defined in claim 1, further including a sorter to remove outliers from the original data.

9. The apparatus as defined in claim 1, wherein the obfuscation adjustments include utilizing conditional entropy.

10. A method comprising:
    collecting, by instructions executed with at least one processor, original data corresponding to (a) confidential information associated with consumers and (b) behavior information associated with the consumers;
    determining, by instructions executed with the at least one processor, a degree to which the original data is to be obfuscated and a type of obfuscation to be applied to the original data based on (i) a degree of privacy and (ii) a degree of similarity between the original data and obfuscated data;
    determining, by instructions executed with the at least one processor, if a threshold level of the degree of privacy is met;
    in response to the threshold level of the degree of privacy not being met, refraining from generating the obfuscation adjustments;
    in response to the threshold level of the degree of privacy being met, generating, by instructions executed with the at least one processor, obfuscation adjustments of the original data based on the degree to which the original data is to be obfuscated and the type; and
    generating, by instructions executed with the at least one processor, an obfuscation model based on the obfuscation adjustments.

11. The method as defined in claim 10, further including:
    applying, by instructions executed with the at least one processor, the obfuscation adjustments to the original data to generate obfuscated data;
    verifying, by instructions executed with the at least one processor, that the obfuscation adjustments exceed an obfuscation adjustment threshold value; and
    verifying, by instructions executed with the at least one processor, that a similarity index value between first calculated data that is associated with the original data and second calculated data that is associated with the obfuscated data exceeds a similarity threshold.

12. The method as defined in claim 10, wherein the generating of the obfuscation model includes applying the obfuscation adjustments to (a) the confidential information and (b) the behavior information.

13. The method as defined in claim 10, further including:
    selecting, by instructions executed with the at least one processor, a set of the confidential information associated with at least one of the consumers; and
    calculating, by instructions executed with the at least one processor, a likelihood of determining an identity of the at least one of the consumers based on the set of the confidential information and the behavior information, wherein the obfuscation adjustments are generated in response to the likelihood satisfying a threshold criteria.

14. The method as defined in claim 10, wherein the obfuscation model is an obfuscation data converter to be applied to another set of confidential information.

15. The method as defined in claim 10, wherein the obfuscation adjustments include noise to be applied to the original data.

16. The method as defined in claim 15, wherein the noise includes multiplicative Laplace noise or Poisson noise.

17. The method as defined in claim 10, further including sorting, by instructions executed with the at least one processor, to remove outliers from the original data.

18. The method as defined in claim 10, wherein the obfuscation adjustments include utilizing conditional entropy.

19. A non-transitory computer readable medium comprising instructions, which when executed, cause at least one processor to at least:
collect original data corresponding to (a) confidential information associated with consumers and (b) behavior information associated with the consumers;
determine a degree to which the original data is to be obfuscated and a type of obfuscation to be applied to the original data based on (i) a degree of privacy and (ii) a degree of similarity between the original data and obfuscated data;
determine if a threshold level of the degree of privacy is met;
in response to the threshold level of the degree of privacy not being met, refrain from generating the obfuscation adjustments;
in response to the threshold level of the degree of privacy being met, generate obfuscation adjustments of the original data based on the determined degree to which the original data is to be obfuscated and the type; and
generate an obfuscation model based on the obfuscation adjustments.

20. The non-transitory computer readable medium as defined in claim 19, wherein the at least one processor is caused to:
apply the obfuscation adjustments to the original data to generate obfuscated data;
verify that the obfuscation adjustments exceed an obfuscation adjustment threshold value; and
verify that a similarity index value between first calculated data that is associated with the original data and second calculated data that is associated with the obfuscated data exceeds a similarity threshold.

21. The non-transitory computer readable medium as defined in claim 19, wherein the at least one processor is caused to generate the obfuscation model by applying the obfuscation adjustments to (a) the confidential information and (b) the behavior information.

22. The non-transitory computer readable medium as defined in claim 19, wherein the at least one processor is caused to:
select a set of the confidential information associated with at least one of the consumers; and
calculate a likelihood of determining an identity of the at least one of the consumers based on the set of the confidential information and the behavior information, wherein the obfuscation adjustments are generated in response to the likelihood satisfying a threshold criteria.

23. The non-transitory computer readable medium as defined in claim 19, wherein the obfuscation model is an obfuscation data converter to be applied to another set of confidential information.

24. The non-transitory computer readable medium as defined in claim 19, wherein the obfuscation adjustments include noise to be applied to the original data.

25. The non-transitory computer readable medium as defined in claim 24, wherein the noise includes multiplicative Laplace noise or Poisson noise.

26. The non-transitory computer readable medium as defined in claim 19, wherein the at least one processor is caused to sort the original data to remove outliers.

27. The non-transitory computer readable medium as defined in claim 19, wherein the obfuscation adjustments include utilizing conditional entropy.

28. The apparatus as defined in claim 1, wherein the data obfuscator is to determine the degree to which the original data is to be obfuscated based on a threshold accuracy of obfuscated data.

29. The apparatus as defined in claim 1, wherein the data obfuscator is to determine the degree to which the original data is to be obfuscated based on obfuscated data being obfuscated to conceal at least one of the confidential information or the behavior information.

30. The apparatus as defined in claim 1, wherein the data obfuscator is to determine if the threshold level is met by calculating a degree of privacy of obfuscated data and comparing the degree of privacy to the threshold level.

31. An apparatus comprising:
at least one memory;
instructions; and
a processor to execute the instructions to:
collect original data corresponding to (a) confidential information associated with consumers and (b) behavior information associated with the consumers,
determine a degree to which the original data is to be obfuscated and a type of obfuscation to be applied to the original data based on (i) a degree of privacy and (ii) a degree of similarity between the original data and obfuscated data,
determine if a threshold level of the degree of privacy is met;
in response to the threshold level of the degree of privacy not being met, refrain from generating the obfuscation adjustments;
in response to the threshold level of the degree of privacy being met, generate obfuscation adjustments of the original data based on the determined degree to which the original data is to be obfuscated and the type, and
generate an obfuscation model based on the obfuscation adjustments.

32. The apparatus as defined in claim 31, wherein the processor is to:
apply the obfuscation adjustments to the original data to generate obfuscated data;
verify that the obfuscation adjustments exceed an obfuscation adjustment threshold value; and
verify that a similarity index value between first calculated data that is associated with the original data and second calculated data that is associated with the obfuscated data exceeds a similarity threshold.

33. The apparatus as defined in claim 31, wherein the processor is to generate the obfuscation model by applying the obfuscation adjustments to (a) the confidential information and (b) the behavior information.

34. The apparatus as defined in claim 31, wherein the processor is to:
select a set of the confidential information associated with at least one of the consumers; and
calculate a likelihood of determining an identity of the at least one of the consumers based on the set of the confidential information and the behavior information, wherein the obfuscation adjustments are generated in response to the likelihood satisfying a threshold criteria.

35. The apparatus as defined in claim 31, wherein the obfuscation model is an obfuscation data converter to be applied to another set of confidential information.

36. The apparatus as defined in claim 31, wherein the obfuscation adjustments include noise to be applied to the original data.

37. The-apparatus as defined in claim 36, wherein the noise includes multiplicative Laplace noise or Poisson noise.

38. The apparatus as defined in claim 31, wherein the processor is to sort the original data to remove outliers.

39. The apparatus as defined in claim 31, wherein the obfuscation adjustments include utilizing conditional entropy.

* * * * *